(12) United States Patent
Printz et al.

(10) Patent No.: US 11,743,220 B2
(45) Date of Patent: Aug. 29, 2023

(54) USER NOTIFICATION FOR DIGITAL CONTENT ACCESS SYSTEMS PER MUTABLE OR FIXED SELECTION CRITERIA

(71) Applicant: PROMPTU SYSTEMS CORPORATION, Menlo Park, CA (US)

(72) Inventors: Harry William Printz, San Francisco, CA (US); Jason Simpson, Redwood City, CA (US); Rhys McCane, Gold Coast (AU)

(73) Assignee: Promptu Systems Corporation, Menlo Park, CA (US)

( * ) Notice: Subject to any disclaimer, the term of this patent is extended or adjusted under 35 U.S.C. 154(b) by 0 days.

(21) Appl. No.: 17/093,583

(22) Filed: Nov. 9, 2020

(65) Prior Publication Data
US 2021/0144115 A1    May 13, 2021

Related U.S. Application Data

(60) Provisional application No. 62/933,402, filed on Nov. 9, 2019.

(51) Int. Cl.
*H04L 51/224* (2022.01)
*G06F 3/04842* (2022.01)
*G06Q 30/02* (2023.01)
*H04L 51/58* (2022.01)
*H04L 67/54* (2022.01)

(52) U.S. Cl.
CPC ........ *H04L 51/224* (2022.05); *G06F 3/04842* (2013.01); *G06Q 30/02* (2013.01); *H04L 51/58* (2022.05); *H04L 67/54* (2022.05)

(58) Field of Classification Search
None
See application file for complete search history.

(56) References Cited

U.S. PATENT DOCUMENTS 9,110,953 B2 * 8/2015 Steinberg ......... H04N 21/45457
10,789,764 B2 * 9/2020 Rowley ................... G06T 19/00
(Continued)

OTHER PUBLICATIONS

International Search Report and Written Opinion for International Application No. PCT/US20/59749 dated Feb. 4, 2021, 8 pages.

*Primary Examiner* — Dhairya A Patel
(74) *Attorney, Agent, or Firm* — Perkins Coie LLP; Michael Glenn; Andrew T. Pettit

(57) ABSTRACT

A computer-implemented method for monitoring and notifying a user of changes to characteristics of interest list items. The method includes recording within a memory of a user device a specification of a user's interest list items and characteristics thereof, and a specification of the user's criteria for notification of changes to the characteristics. The method includes receiving at the user device update information including updated characteristics of interest list items, comparing the update information with the recorded specifications, and determining that the user's criteria for notification of changes to characteristics of interest list items are satisfied. In response, a notification of the changes is generated for the user. The method further includes replacing the recorded characteristics with the updated characteristics of the interest list items.

21 Claims, 15 Drawing Sheets

(56) References Cited

U.S. PATENT DOCUMENTS

| | | | |
|---|---|---|---|
| 11,089,354 B1* | 8/2021 | Ramani | H04N 21/25891 |
| 2006/0218226 A1 | 9/2006 | Johnson et al. | |
| 2006/0270419 A1* | 11/2006 | Crowley | H04W 4/023 |
| | | | 455/456.2 |
| 2007/0073593 A1 | 3/2007 | Perry et al. | |
| 2011/0107374 A1* | 5/2011 | Roberts | H04N 21/6582 |
| | | | 725/50 |
| 2011/0296456 A1 | 12/2011 | Pandala | |
| 2013/0090980 A1* | 4/2013 | Hummel | G06Q 50/01 |
| | | | 705/7.29 |
| 2013/0091215 A1 | 4/2013 | Funk et al. | |
| 2013/0167168 A1* | 6/2013 | Ellis | H04N 5/50 |
| | | | 725/12 |
| 2014/0250383 A1* | 9/2014 | Berger | G06F 3/04847 |
| | | | 715/738 |
| 2014/0279002 A1* | 9/2014 | Grigg | G06Q 30/0261 |
| | | | 705/14.58 |
| 2014/0359647 A1* | 12/2014 | Shoemake | H04N 21/6582 |
| | | | 725/10 |
| 2015/0120875 A1* | 4/2015 | Yao | H04N 21/23116 |
| | | | 709/219 |
| 2016/0140671 A1* | 5/2016 | Hong | G06Q 50/01 |
| | | | 705/319 |
| 2016/0188201 A1* | 6/2016 | Hosier, Jr. | H04L 67/306 |
| | | | 715/753 |
| 2016/0283925 A1* | 9/2016 | Lavu | G06Q 20/401 |
| 2016/0330580 A1* | 11/2016 | Navarro | G06Q 30/0641 |
| 2016/0343037 A1* | 11/2016 | Nicholas | G06Q 30/0269 |
| 2016/0352670 A1* | 12/2016 | Lawler | H04L 65/403 |
| 2017/0150225 A1* | 5/2017 | Trollope | H04N 21/44226 |
| 2018/0183885 A1* | 6/2018 | Newell | G10L 15/30 |
| 2018/0234734 A1* | 8/2018 | Parker | H04N 21/4826 |
| 2018/0350144 A1* | 12/2018 | Rathod | G06Q 20/3224 |
| 2019/0018971 A1* | 1/2019 | Shmaya | H04L 12/22 |
| 2019/0158519 A1* | 5/2019 | Frank | H04L 63/1425 |
| 2021/0056750 A1* | 2/2021 | Rowley | G06T 7/292 |
| 2021/0144115 A1* | 5/2021 | Printz | G06F 3/0482 |
| 2021/0158843 A1* | 5/2021 | Graham | H04N 5/76 |
| 2022/0121343 A1* | 4/2022 | Ratter | G06T 7/70 |
| 2022/0351236 A1* | 11/2022 | D'Auria | G06Q 30/0242 |

\* cited by examiner

US 11,743,220 B2

USER NOTIFICATION FOR DIGITAL CONTENT ACCESS SYSTEMS PER MUTABLE OR FIXED SELECTION CRITERIA

CROSS-REFERENCE TO RELATED APPLICATION

This application is entitled to the benefit of and claims priority to U.S. Provisional Patent Application No. 62/933,402, entitled "User Notification Within Digital Content Access Systems per Mutable or Fixed Selection Criteria" filed Nov. 9, 2019, the contents of which are incorporated herein by reference in their entirety for all purposes.

BACKGROUND OF THE INVENTION

Technical Field

The technical field of the invention includes systems and architectures for access to digital content, notably video content.

Description of Prior Art

With the advent of digital representations of all manner of media—for example video, music, text and games—there has arisen a robust business of on-demand delivery of digital content, typically but not exclusively over the Internet.

Examples of existing businesses that provide such content to the consumer include Netflix™ (provider of video), Amazon Prime™ (provider of video, music and text) and Apple iTunes™ (provider of video, music and games). Even television programming providers that have typically operated by conventional over-the-air RF transmission, by wired cable delivery, or both, like ABC, CBS and NBC (over-the-air and cable), or AMC or Bravo™ (cable only), now supplement RF and cable delivery modes with so-called streaming services.

There are already a large number of such services. For example, a quick count as of this writing yields at least 30 major video streaming services operating in the US. (This number may seem quaint to future readers of this document.)

These services—both video streaming services, and other media providers—compete on any and all marketable advantages or characteristics.

SUMMARY

The invention exists in a variety of forms, according a variety of benefits to both users and operators of the system. Here we list some of these various forms. This list is exemplary only and not limiting.

In one form the system notifies the user when one or more items on the user's watch list become newly available for viewing from a supported content provider. This notification may include the title(s) of the item(s).

In another form the system notifies the user when one or more items on the user's watch list become newly available from any of the user's preferred providers. This notification may include the title(s) of the item(s) and the associated provider(s) from which it is newly available.

In another form the system notifies the user when any notification criteria for one or more items on the user's watch list are newly satisfied. For instance the system may notify the user when the price of an item drops, when the offering terms of an item change, when the available resolutions of an item are expanded, or when any other notification criteria are satisfied. The system may also notify the user not only when notification criteria are newly satisfied. For example the system may provide not only a user notification when notification criteria are newly satisfied, but in addition user notifications of the same occurrence once a day for a fixed number of days thereafter, or more or less frequently. This feature may be under explicit control of the user. Additionally the system may provide user notifications in multiple forms, for example via both the capabilities of the operating system of a user device and also via a social media messaging application. This feature too, or more generally the selection of the form of the notification, may also be under explicit control of the user. Additionally a single notification may contain information about multiple titles; alternately information about multiple titles may be presented in separate notifications. This feature too may also be under explicit control of the user.

In another form the system may find, among a group of users, one or more items on the watch list of each of the group members. This finding may be performed upon an explicit user action, for example operating a control on a user device, issuing a spoken or written natural language command, or some other action; it may also be performed asynchronously with (that is, independent of) any explicit user action. This notification may be generated for each group member; the notification of each user may include the title of the items(s) found on each watch list.

In another form the system may find, among a group of users, one or more items on the watch list of each of the group members, which is also available from one or more preferred providers of each of the group members. As above this finding may be performed upon an explicit user action, for example operating a control on a user device, issuing a spoken or written natural language command, or some other action; it may also be performed asynchronously with (that is, independent of) any explicit user action. The notification to each user may include the title of the item(s) and the associated provider(s), for the given user, from which the item(s) are available.

In another form the system may find, for a given user, one or more other individuals, within a community of users, with whom the subject user may wish to form an affinity group, and notify the subject user and candidate affinity group members of this finding. The system may include provisions for establishing and conducting communication among candidate or actual affinity group members.

In another form the system may include features and controls to support the creation, maintenance and management of a group of users, with membership determined by mutual consent among said users. These features may include support for textual and other forms of communication among group members.

BRIEF DESCRIPTION OF THE DRAWINGS

The techniques introduced here may be better understood by referring to the following Detailed Description in conjunction with the accompanying drawings, in which like reference numerals indicate identical or functionally similar elements. The drawings may exhibit commercially available devices, materials or mechanisms; however these are exemplary only and are not intended to limit the application of the ideas expressed herein.

DETAILED DESCRIPTION OF PREFERRED EMBODIMENTS

Nomenclature

Figure 1:
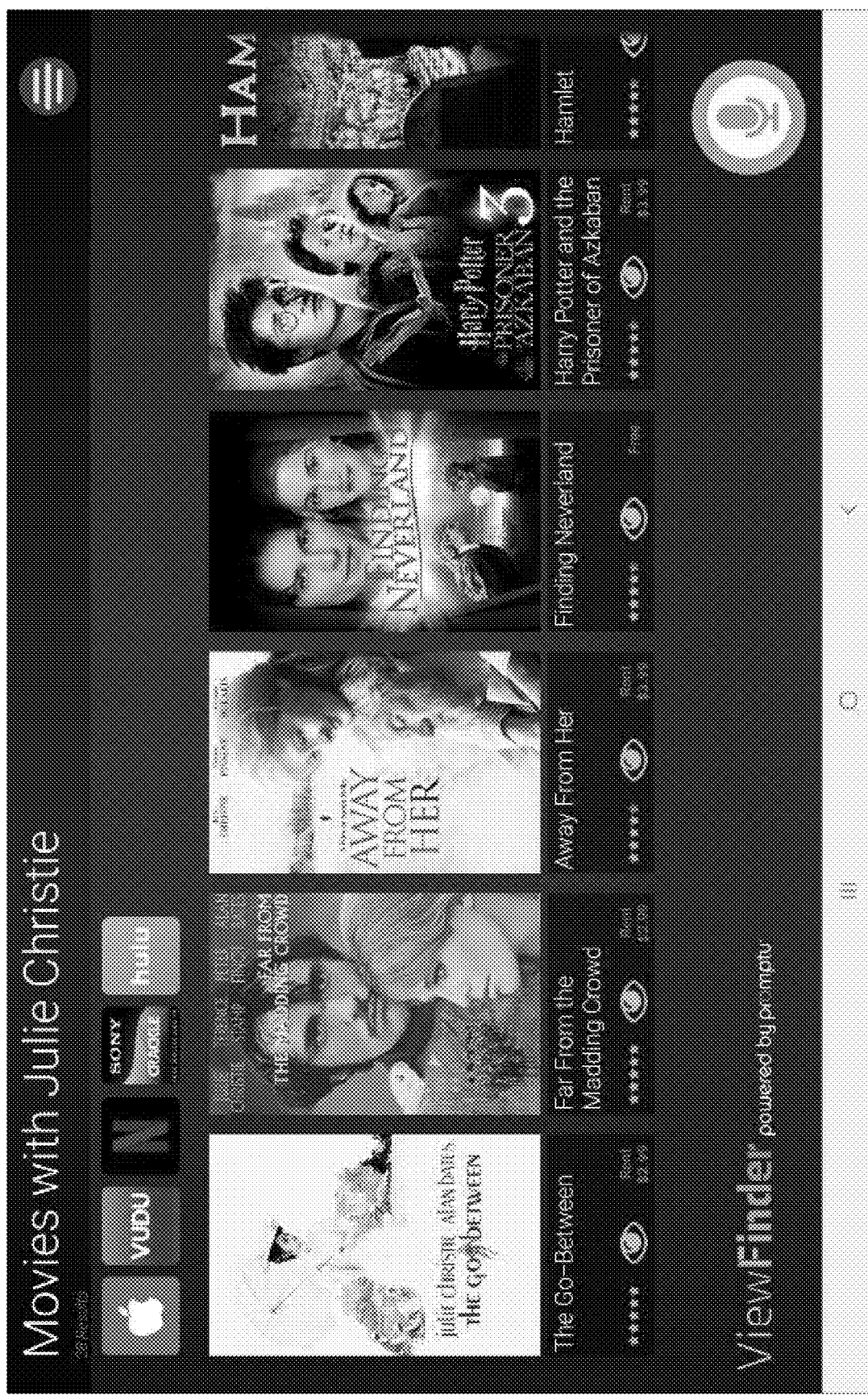
FIG. 1: Example ViewFinder™ Response to Query "Show me movies with Julie Christie." Note the small, stylized drawing of a human eye at the bottom center of each displayed title. This is an example of a control that permits a user to add a title to the user's watch list. This is an example only and should not be regarded as limiting or defining.

The word "criteria," which appears in both the title and body of this document, is nominally plural. However it is to be understood, in both the title and the body, to be used in both the plural and singular senses, unless explicitly noted to the contrary. Thus the word "criteria" is to be understood to mean "criterion or criteria," unless explicitly noted to the contrary In what follows we will variously refer to an individual digital content item as "an item," "an asset," or "a title"; unless explicitly stated otherwise these are to be understood as equivalent. The word "content" may be inserted before the noun in any of the preceding phrases without changing its meaning. If a digital content item is digital video, we may also refer to it as "a video." Again in the context of digital video, an item may comprise a collection of related videos, for example an entire season of episodes of an episodic television production. We may refer to digital content in general as simply "content," "assets," "titles," "items" and their synonyms.

An entity (typically but not necessarily a profit-seeking business) that provides digital content to consumers will be referenced as a "digital content service," a "content service," or if clear from context, simply as a "service"; the word "provider" may also be used in any such phrase, as in "digital content provider," "content provider" or "provider," with the same meaning. A digital content service that delivers content as a stream, rather than a single whole and complete object, will be referenced as a "streaming service," or again if clear from context, simply as a "service." (This does not exclude any "service" from delivering a content item as a single whole and complete object.) References to services that provide a particular type of media may include a descriptive word to that effect, as in "video streaming service."

A "content catalog," sometimes abbreviated "catalog," is a list of the content items offered to the consumer by a given provider. At a minimum this list details the name or other means of identifying each offered content item. Typically the list entry for an item includes additional descriptive detail, such as the item type (e.g., a video, an audio recording, a computer game), price and offering terms, and other information that may be of interest to the consumer in selecting a content item. As the digital content item itself is the data that is ultimately viewed, listened to or otherwise utilized by the consumer, the aforementioned descriptive detail, which is about the subject item, is referred to as "metadata." Note therefore that each service generally dispenses both content items—the "data"—and the aforementioned descriptive detail—the "metadata."

Each content provider typically has its own catalog, though a given content item may appear in more than one provider's catalog. A catalog that is formed by assembling metadata from a multiplicity of providers, typically including with each item the one or more offering providers, and the possibly distinct offering terms and other characteristics (e.g. video resolution) particular to each provider, is a "consolidated catalog." A consolidated catalog typically contains only metadata, and not the actual content item itself. We will variously refer to the information stored in a consolidated catalog, or any functionally similar repository, as both "metadata" and "characteristics." In particular references to "item of interest characteristics," "item of interest metadata," "list item characteristics" and "list item metadata" are to be regarded as one and the same.

By "offering terms" is meant the content provider's terms for a commercial transaction, which are typically but not exclusively sale or rent at a given price, or free. We will also use the words "terms of use" for "offering terms."

As noted above there already exists a large and growing number of content providers. The system under discussion here may gather, and may monitor on behalf of its users, the metadata of many content providers. However not every provider may be monitored by the system. We will refer to those providers whose catalogs are monitored by a given instance of the system as the "supported providers" of that instance.

Likewise, as we shall explain further below, the user of an instance of the system may wish to direct the system to provide notifications regarding the offerings of only certain providers, and more generally to attend only to certain providers for the purposes of utilizing the various functions and benefits of the system. For example, the user may desire notifications regarding only those providers to which the user is currently subscribed, or which the user is considering subscribing to. Or as another example the user may wish to have known within a group of users that the user is currently subscribed only to certain providers. Or as yet another example the user may wish to explore the benefit if any of subscribing to or unsubscribing from certain providers. We will refer to the providers so selected as the user's "preferred providers." The foregoing examples are listed only for clarification and are not intended to limit the means of selection or scope of utility of preferred providers. A user's preferred providers may also be selected, in whole or part, by automatic means (that is, without explicit action by the user), for example by inspection of a user device to identify installed content display applications specific to a given content provider.

The digital content business is already sufficiently robust that there exist commercial enterprises that may do no more than gather the metadata of some number of content services. We will refer to any business that performs this function, possibly in addition to performing additional commercial functions, as a "metadata aggregator."

The terms "user" and "consumer" will generally be used interchangeably throughout, as referencing an individual or individuals who make use of (i.e., view, listen to, read, play, etc.) digital content, and/or of the invention itself.

As we shall explain below the user may gain access to and enjoy the benefits of the system by means of an electronic device, such as a smartphone (for example an Apple iPhone™), a tablet (for example a Samsung Galaxy Tab A 10.5™), a laptop (for example a Dell Inspiron™), a desktop computer or any other device of similar capabilities. We will refer to such a device as a "user device"; for greater specificity we may also refer to a "user tablet device," a "user mobile device," a "user laptop device" and so on. As known to one skilled in the art, each such user device has the capability to retain information when powered off, that is, in non-volatile memory; we will also refer to such memory as "storage." These same words may also be used to denote memory and storage media in general, that is, whether volatile or not, and whether part of the user device or some other device.

This discussion is not exhaustive. Definitions of other pertinent concepts or word senses may appear elsewhere within the body of this document, or may be inferred from context.

Platform

The platform of the invention includes a system for assisting users in finding and/or consuming content of interest. This system may comprise a software application running on a user device, with an associated server component accessed over the Internet. Or it may comprise said software application operating on its own, with no associated server component. This may require architectural modifications to enable user device access to metadata nominally fetched from the server component. Or it may comprise a cloud-based service operating on its own and accessed via a conventional web browser; thus, without a purpose-built application running on a user device. This may require architectural modifications to enable the storage of information associated with an individual user at a web server.

An example of such a system, comprising a software application and associated server component, is the ViewFinder™ system of Promptu Systems Corporation. FIG. 1 shows the results provided by ViewFinder™ when presented with the query "show me movies with Julie Christie" on a display device.

Figure 2:
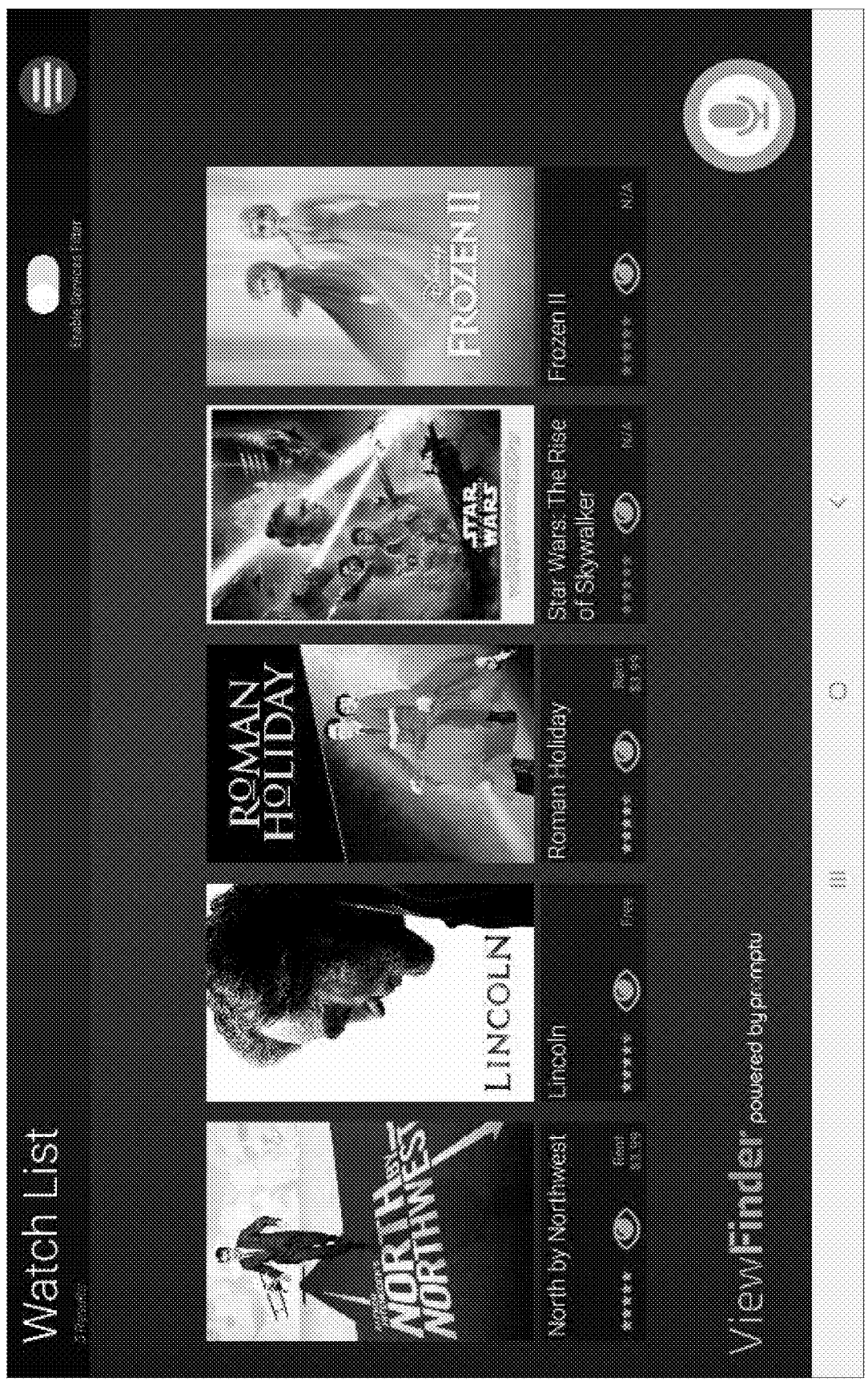
FIG. 2: Example of a Watch List in the ViewFinder™ Application. This watch list comprises 5 videos. In this example, only the first three are available for streaming.

However in addition to possibly helping the user find and then immediately consume the content—a function which the application or service may also perform, or invoke a separate application or service to perform—the system may also allow the user to create and maintain, or to have created and maintained by automatic means, an "interest list." When the media in question is digital video, this is called a "watch list." If the media is digital music, it is called a "listen list." And likewise for other media types. An example of a watch list appears in FIG. 2.

An item on an interest list may be referenced variously and equivalently as an "interest item," an "item of interest," a "monitored item," or if clear from context, simply an "item." The interest list itself may be variously and equivalently referred to as the "items of interest list," which is comprised of "interest list items" and likewise of "items of interest."

The system may also provide a means for the user to specify one or more criteria, associated with one or more interest items, or with all interest items, which when fully or partially satisfied constitute reason for notifying the user of this event. Examples of such criteria include, but are not limited to, availability of an item from any provider, availability of an item from a particular provider, a drop in price of an item (possibly below a predetermined threshold), availability of an item for rent rather than purchase, availability of an item at a particular video resolution, or some other characteristic or combination of characteristics. These are the so-called "selection criteria"; we will also sometimes refer to these criteria as "notification criteria."

Note that some selection criteria are to be regarded as satisfied when they attain a particular value, as in availability from a particular provider. Other selection criteria are to be regarded as satisfied by a change in some characteristic, such as a drop in price.

The aforesaid selection criteria are nominally assignable by the user, and hence "mutable" in the sense of the name of this document. However alternative versions of the system exist in which some or all of the selection criteria may be fixed, defaulted or automatically deduced, in whole or part, from the user's past behavior, explicitly declared interests or priorities, or other characteristics or information available to the system.

The architecture and features of the system may provide support for a community of users, that is, a multiplicity of users, whose interactions may thereby be enabled and enhanced. The system may provide for creation of individual user accounts or logins, either by inbuilt implementation of this capability, or by exploiting existing commercial mechanisms for achieving this same end. An example of the latter would be attaching the system account to a user's "Apple ID." Such individual user accounts may be used to store pertinent user characteristics, for example the user's watch list, preferred service, notification criteria, search history or viewing history.

Further to this end, the system may provide for creation of user affinity groups; that is, groups of two or more system users who mutually agree to share for example their watch lists or other pertinent information, so that they may thereby utilize certain beneficial system features, described below. The system may provide a facility for automatic discovery or proposal of affinity group membership, for example by mutual introduction of users who have similar characteristics. The system may also provide facilities for communication between individual users, including users who may not previously have known one another, or among or between members of an affinity group. We may also refer to an affinity group as just a "group."

The system may include the ability for a user to share a specific title recommendation or to share their entire watch list. The sharing may take place from one system user to a single individual, who may or may not be a current user of the system; it may also take place within an affinity group.

PREFERRED EMBODIMENTS

For concreteness and clarity we will describe the system for the case of users of video streaming services, and where it may comprise both a software application running on a user device, and a server component, with which it may be intermittently connected. However this is presented only as an example for clarity, and is not intended to be limiting. The description can be generalized, in appropriate ways, to all manner of digital media, available from providers of that media, and to other architectures of the system. Moreover, the system may exist in a multiplicity of forms, configurations, variants or architectures, which may offer similar, overlapping or different benefits, with respect to one another.

To begin we observe that a consumer of digital video may have interest in viewing one of a number of films, but only when available at or below a given price, or from a particular streaming service to which the user may be presently subscribed, or when satisfying some other characteristic or set of characteristics. For instance, they may have an aversion to theaters (Ticket prices are so high! All the good seats may be taken! And you never know when you'll find yourself seated next to a party who want to have a loud and animated discussion of the film as they watch it.) and therefore be eagerly awaiting the availability of a given title on a video streaming service. Or they may desire only videos of a particular resolution or higher.

As previously noted there is already a robust business ecosystem of video streaming services and other media providers. These providers compete on any and all marketable advantages or characteristics, including but not limited to offering terms (for instance, subscription, pay to rent content item, pay to own content item, and variants), subscription price, individual asset price, catalog size (that is, the number of assets available from the service), breadth and specificity of genres, depth of offerings within each genre, video aspect ratio (for instance, 4×3, 16×9, 16×10, and variants), video resolution (for instance, High Definition or HD, Full HD or FHD, Ultra HD or 4K, 8K, and variants), video recording format and/or codec, audio sampling rate (for instance, 44.1 KHz, 48 KHz, 96 KHz, and variants), audio recording format and/or codec (for instance, MP3, PCM and variants) and others. The preceding list of advantages and characteristics, which may pertain to a given service in general, or to individual assets offered by a service, is long but not exhaustive. Not all characteristics pertain to all media types. Also some characteristics, for instance price, may be of concern to some users but not to others. A similar comment applies to video resolution: a consumer without a 4K or 8K video monitor does not care if video content is available in these resolutions, whereas one who owns such a monitor may be eagerly searching for content that will fully exploit its display capabilities.

It should be noted that the catalog of each service may be subject to frequent change, both with respect to the listed titles, and the characteristics of any given title.

For example, the forthcoming film "Star Wars: The Rise of Skywalker" (forthcoming at the time of this writing), is not available for streaming anywhere. This is because it is still in production. It is presently scheduled for cinematic release in December of 2019. At some interval after this it will presumably become available from the "Disney+™" streaming service, first for purchase, then for rent, and ultimately for free. Similarly, a visually spectacular film like "Gravity" may be available first in HD, then in Ultra HD, and then in 8K. (This example is notional; at this writing the video resolutions at which "Gravity" is available are not known to the authors.)

Thus it is of value to the consumer to know when particular characteristics of one or a number of films change, in a manner favorable to the consumer's selection criteria.

Figure 3:
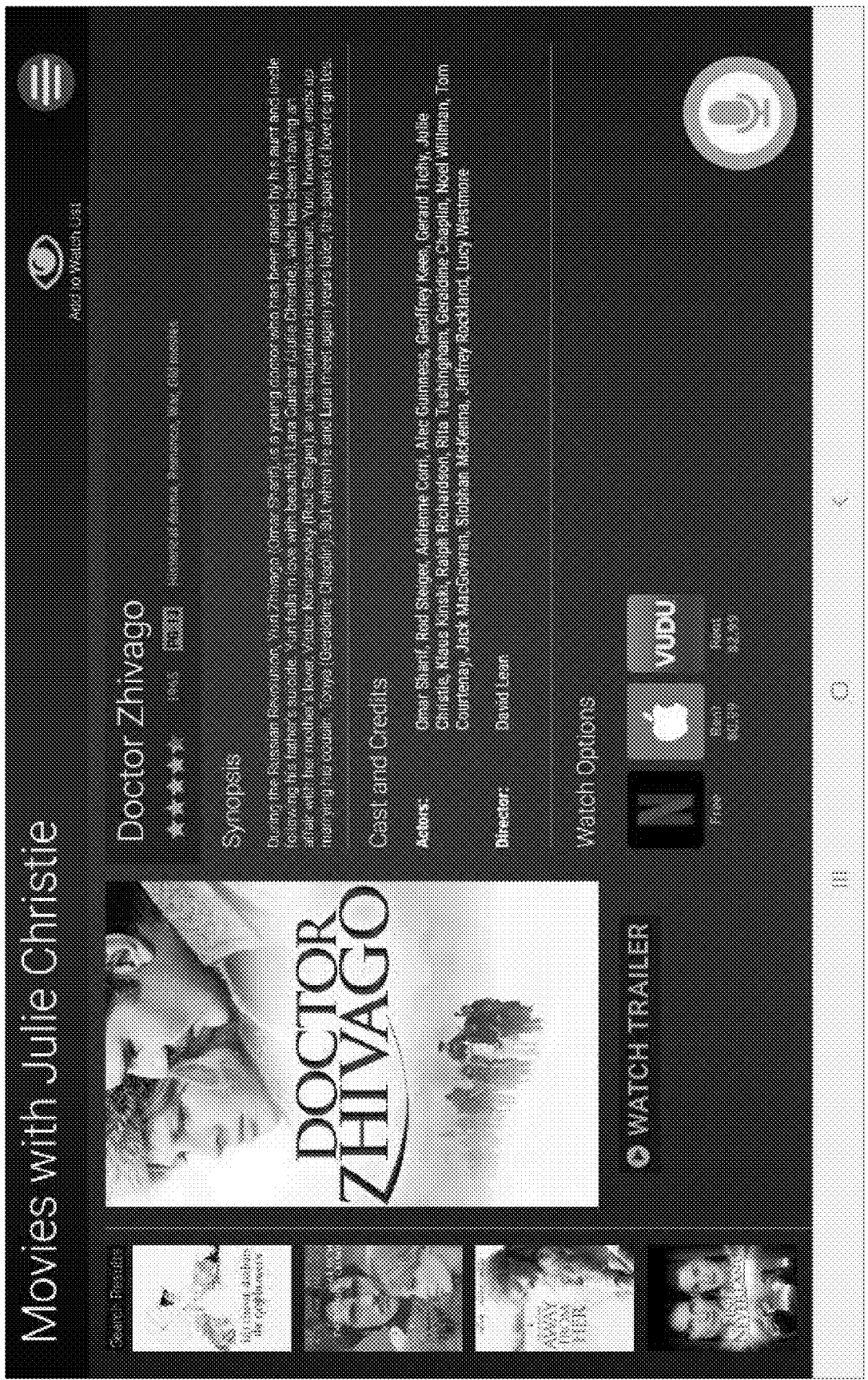
FIG. 3: Example of Video Available from Multiple Providers. Note that each provider offers the video at a different price. Note again the stylized drawing of human eye near the upper right corner, labeled "Add to Watch List." This is another example of a control that permits a user to add a title to the user's watch list. This is an example only and should not be regarded as limiting or defining.

But as noted above there are a large number video streaming services, and a large number of characteristics of particular videos. And a single given video may be available from multiple streaming services, but with varying characteristics. An example appears in FIG. 3.

Therefore it is potentially problematic to determine, from the films of interest to a user, which of them presently meet that user's criteria—wherein said criteria may be idiosyncratic to the individual user in question.

Of course this determination may be made by the user's manual actions, disposing of whatever search mechanism is available for each particular streaming service. But this is painstaking work, and despite the aforementioned high frequency of updates to streaming service catalogs, it may be a long wait for some specific film, or even any one among a list of specific films (that is, comprising those of interest to the user), to meet the user's selection criteria.

Moreover, as viewing a film can be a social activity, it may be of value to a user to asynchronously receive a notification of when, for a film of interest, some service's catalog, terms or other asset characteristic or characteristics are now satisfied (for this may occasion an invitation to assemble with others and view the film).

As mentioned above one embodiment nominally consists of a software application, running on a user device, that communicates with a system server. This is the preferred embodiment. However as described above other configurations are possible, and this embodiment is not to be regarded as limiting.

We now describe the preferred embodiment of a version of the system that provides user notification of monitored items that match specified selection criteria.

The system provides a means for the user to specify the aforesaid selection criteria. A multiplicity of means of specification are possible. For example, the specification may be (a) effected by operating one or more physical or soft controls on the user device, (b) effected by spoken or typed natural language command to the user device, (c) deduced, with no explicit user action, from past user behavior or other user characteristics or (d) determined by some other means. Absent a user specification, the selection criteria may also be defaulted to one or more commonly used settings, for example "any item of interest becomes newly available from a preferred provider."

The system provides a means for a user to create a watch list (generically, an "interest list") of videos that he or she would like to view, and to optionally associate one or more user-determined selection criteria with each video on the watch list. For example, any of the means of specifying the selection criteria recited in the preceding paragraph, or others, may be used, both to create a watch list, and to associate selection criteria with a video on the watch list. Alternately, the same selection criteria may be used for all videos on the watch list. Alternately, no selection criteria may be associated with a video on the watch list. That is, the watch list may function in such cases merely to remind the user that a video is of interest, and that the user does not seek notification regarding changes in the characteristics of the video.

When an item is placed on the watch list, the current value of the selection criteria, for the item in question, is recorded as well. These values may be separately recorded for each preferred video streaming service. These values may be recorded as "empty," if the desired information is not immediately available, or not of interest. Or no such values may be recorded, if there are no associated selection criteria. Alternately, all item metadata that may participate, now or in the future, in any supported selection criteria, may be recorded as well. Such recording may take place within a memory of a user device. As noted above, we may also refer to such item metadata as item "characteristics."

Note therefore that both the selection criteria, for example the fact that a particular item has become available from a particular provider, or is available at a particular price, or is available at a particular video resolution, and the current values associated to that criteria, for example the current list of providers that may offer the particular item, or the current price at which it is available from a particular provider, or the current lowest price at which it is available from any provider, or the current highest video resolution at which it is available, or for any supported selection criteria, may be recorded. Such recording may be within the memory of a user device. We will have reason below to distinguish between metadata recorded at the time an item is placed on the watch list from metadata associated with the item that is received at a later time. In this case we may refer to the former as "current metadata" and the latter as "update metadata" or "updated metadata." Alternately we may likewise refer to "current characteristics" and "update characteristics" or "updated characteristics." If it is clear from context we may refer to "current metadata" as just "metadata" and likewise "current characteristics" as just "characteristics."

Figure 4:
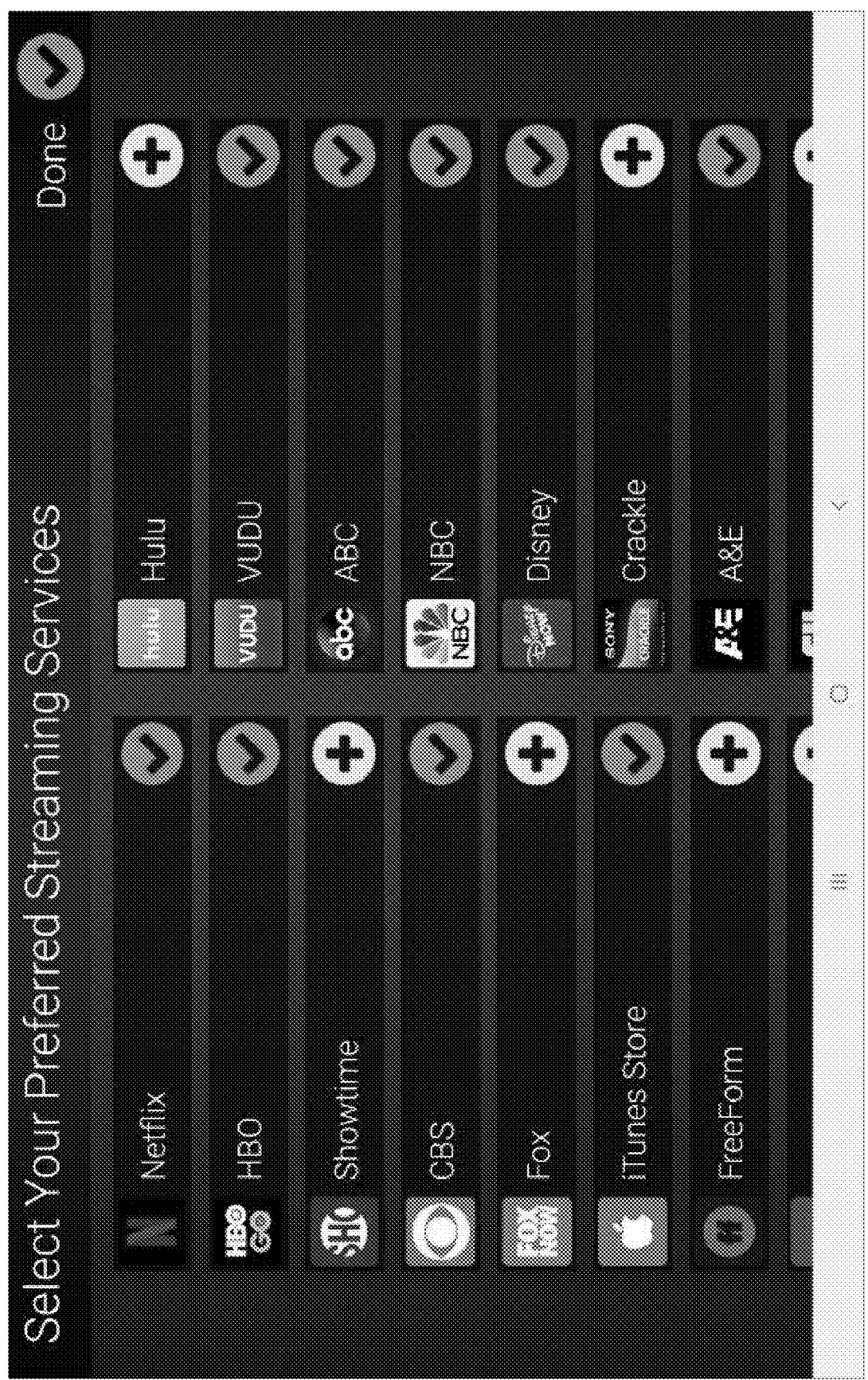
FIG. 4: Example ViewFinder™ Preferred Streaming Services Selection Screen. Streaming service icons that bear a green check mark (effected by touching on the white circle) are selected as "preferred" by the user. This is an example only and should not be regarded as limiting or defining.
Figure 5:
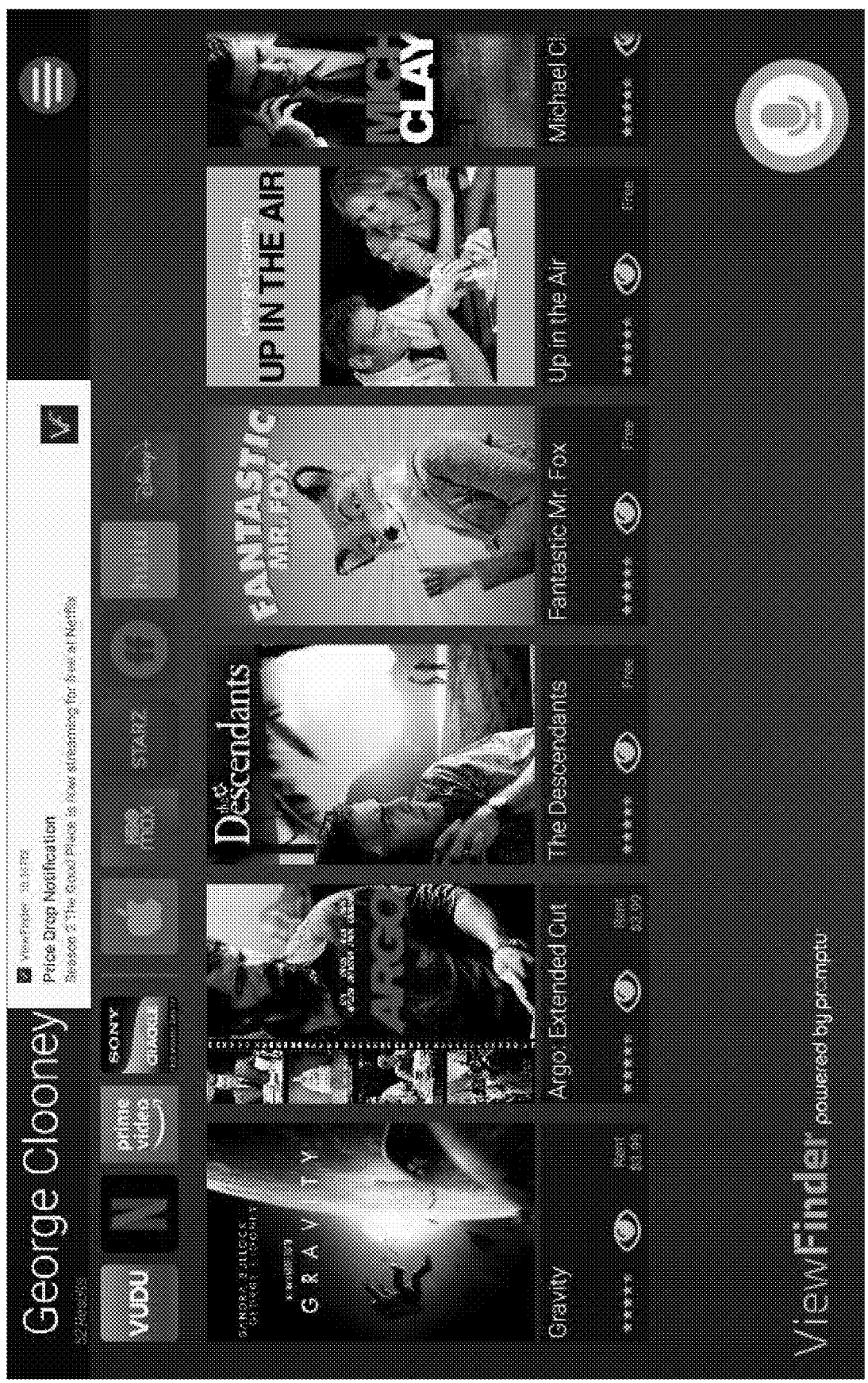
FIG. 5: Example Operating System Price Drop Notification. This shows a typical user notification, delivered via the capabilities of a tablet device operating system. In this case the notification announces that an entire season of television episodes can now be streamed for free by subscribers of content provider "Netflix™."
Figure 6:
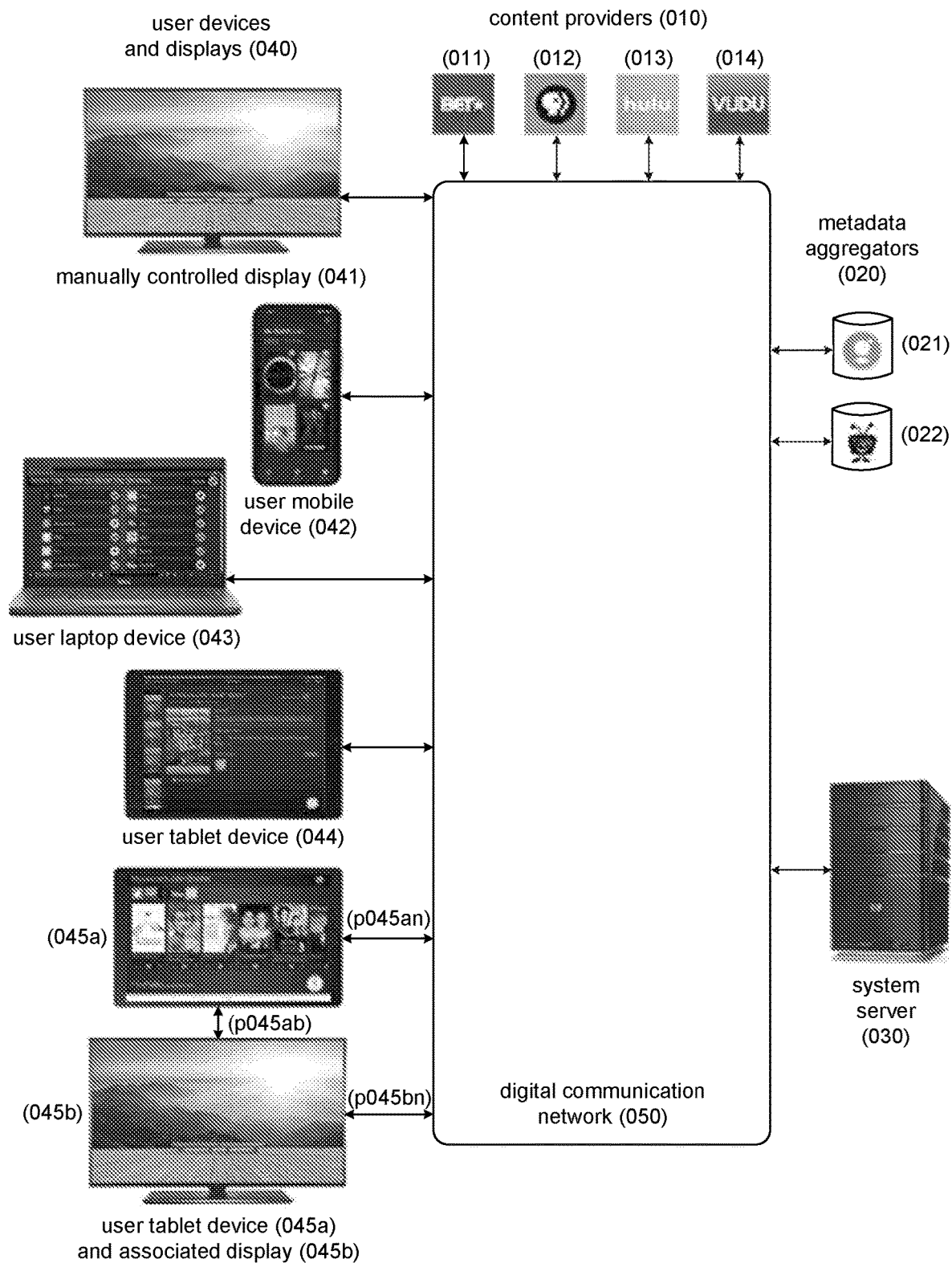
FIG. 6: Example Components of An Embodiment. The type and number of content providers (011, 012, 013 and 014), metadata aggregators (021 and 022), system server (030), user devices and displays (041, 042, 043, 044, 045*a*, 045*b*) and digital communication network (050) are exemplary only and not intended to be limiting or defining. These components and their functions within the system are exemplary only and not intended to be limiting or defining. Furthermore although only a single system server is depicted, the actual implementation of this function in practice may be accomplished by a multiplicity of physically distinct servers, using methods well known to those skilled in the art, and offering the benefits of scalability through load balancing, reliability through redundancy, geographic localization and others. Individual physically distinct servers, within this multiplicity, may comprise or implement identical functions, components, and other operational details, or may differ from one another with respect to functions, components and other operational details.

Here the "preferred" services may be (a) all video streaming services known to the system, (b) those video streaming services to which the user is presently subscribed or has otherwise declared an interest in, or (c) the particular video streaming service or services that the user has associated with any individual monitored item. Thus the system may typically but not necessarily include a mechanism to designate one or more video streaming services as of interest. Such a mechanism, if present, may be an instance of the aforementioned means for the user to specify selection criteria. An example of a user interface that constitutes such a mechanism appears in FIG. 4. Other example mechanisms include spoken or typed natural language command to the user device, and deduction, with no explicit user action, from past user behavior or other user characteristics This done, each item on the interest list is now, by definition, a "monitored item." The system will notify the user when the selection criteria for one or more monitored items have been fulfilled.

For example, the selection criteria may comprise whether the item is available at all from any preferred video streaming service. They may include a drop in price of the item, possibly by some stipulated amount, or below a stipulated threshold, or to available for free. They may include a change in terms of use, as from own to rent. They may include the assignment of a content quality rating, such as a "Metacritic" score, or the rise of a dynamically varying rating, again such as a "Metacritic" score, above a given threshold. These examples are listed for concreteness, and should not be regarded as limiting.

We now describe a preferred method for achieving such user notification. This is not the only such method; the following description should be regarded as exemplary and not limiting. The description that follows is best understood with reference to FIG. 9; cited numbered steps are references to steps in that figure. We shall also make reference to components and data flows depicted in FIG. 7; when so doing we shall make explicit reference to this figure.

Figure 9:
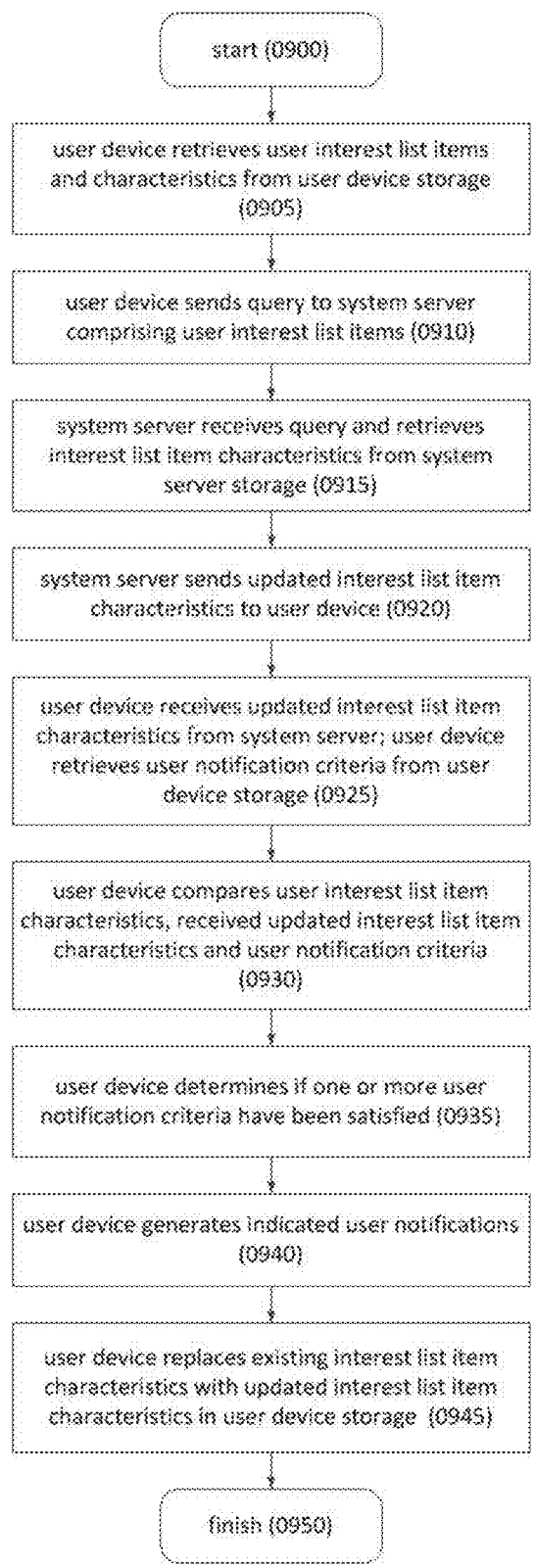
FIG. 9: A Method of Achieving User Notification. A flow diagram of a method of achieving user notification for one embodiment of the system.
Figure 10:
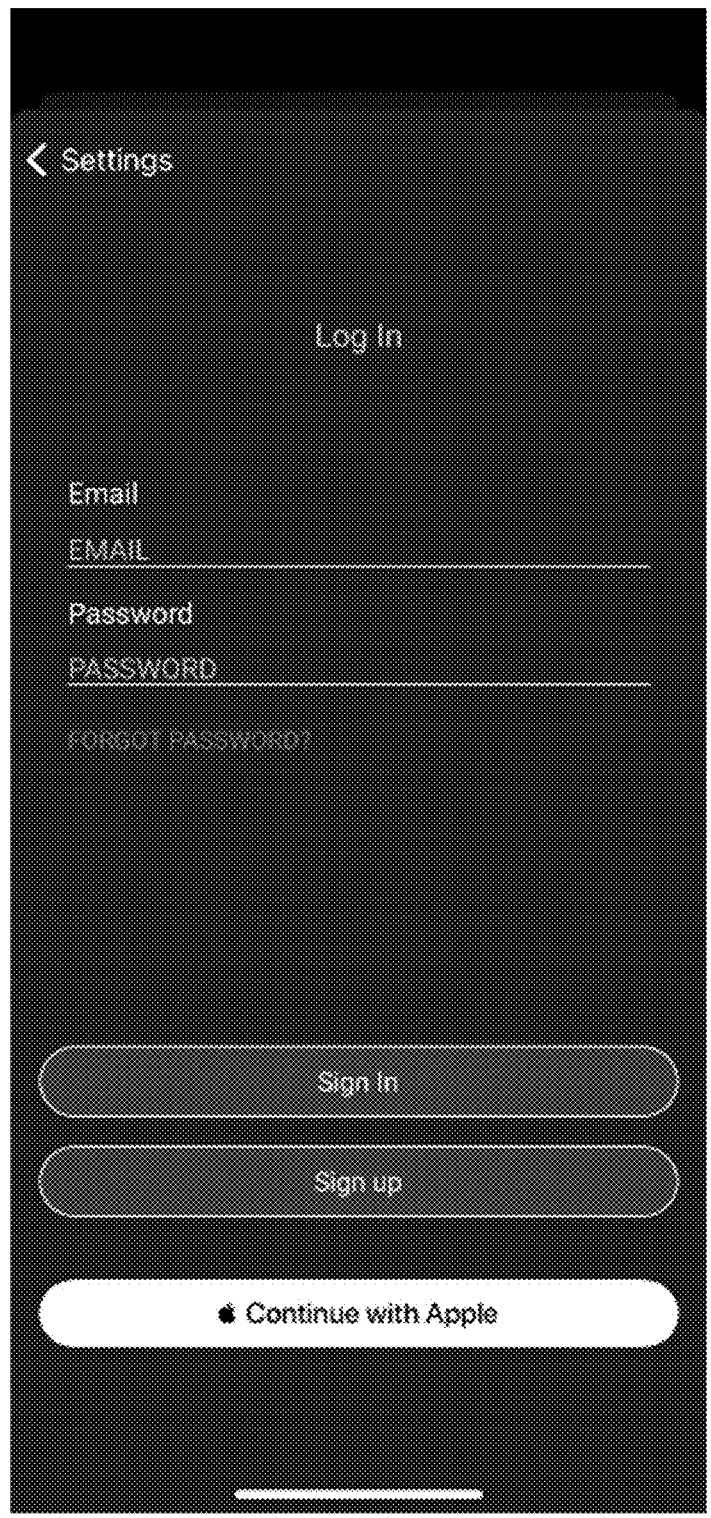
FIG. 10: Example Sign-In/Sign-Up Screen
Figure 11:
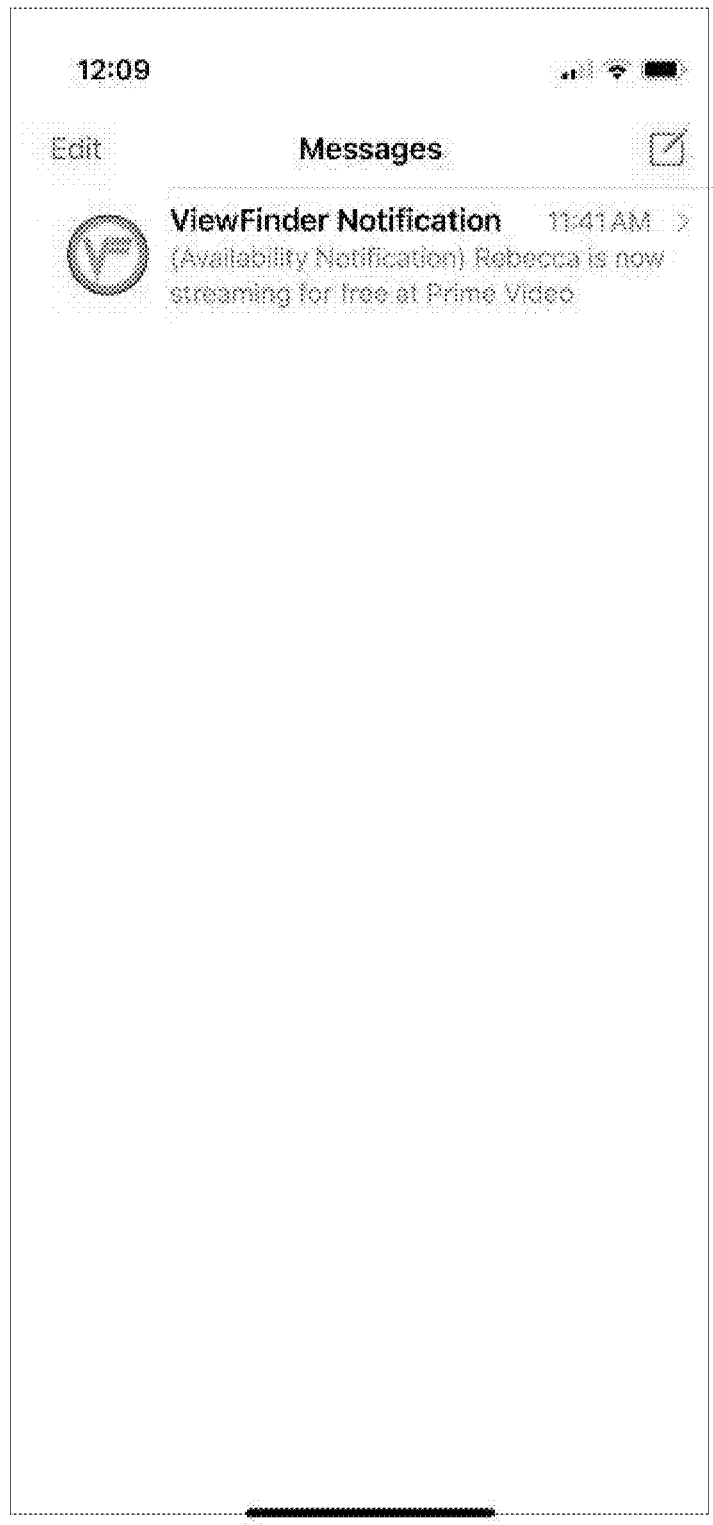
FIG. 11: Example Availability Notification. This shows a typical user notification, delivered as an SMS message to a smartphone. While the text of this figure indicates that a given content item is available free, the actual triggering event is the fact that the indicated item is available for streaming at all.

We preface this description with a brief summary of the steps of the method, which are displayed in FIG. 9. The user device periodically queries a suitable data source to determine current, possibly updated characteristics of each monitored item. For example, this may be done once a day. In the configuration presently being described, this data source resides at the aforementioned server component. The characteristics fetched comprise, at a minimum, those determined by the selection criteria. The updated corresponding characteristics, so obtained, are then compared with the characteristics of each interest list item, currently stored on the server. If this comparison shows that the selection characteristics for the monitored item are now fully (or in some instances, partly) satisfied, the user is notified of this event. The updated characteristics are then stored in the user device, replacing the characteristics currently stored there. This allows that both (a) repeating this operation at a future time does not cause the method to generate a redundant user notification and (b) any future changes to the list item characteristics, which again satisfy the selection criteria, will cause the method to generate a user notification.

We now review the steps of the method in detail. It will be apparent to one skilled in the art that the sequence of steps or actions presented here and in FIG. 9 may be modified, yet achieve the same effect. For example, step 0925, the action of retrieving the user notification criteria from user device storage may take place earlier in the method than as depicted; indeed it may take place contemporaneously with actions being performed at the system server, for example those of step 0915. As another example, step 0945, replacing the list item characteristics stored in the user device with the updated characteristics of same may take place before step 0940, generating the indicated user notifications. As another example, steps that are shown as being completed in a single action, such as retrieving the interest list items from user device storage, may instead be executed serially, yet achieve the same effect. Indeed this comment applies to the execution of the operations of FIG. 9 as a whole.

In a first step, labeled 0905, the user device retrieves the user interest list items, and their associated characteristics, from user device storage.

Figure 7:
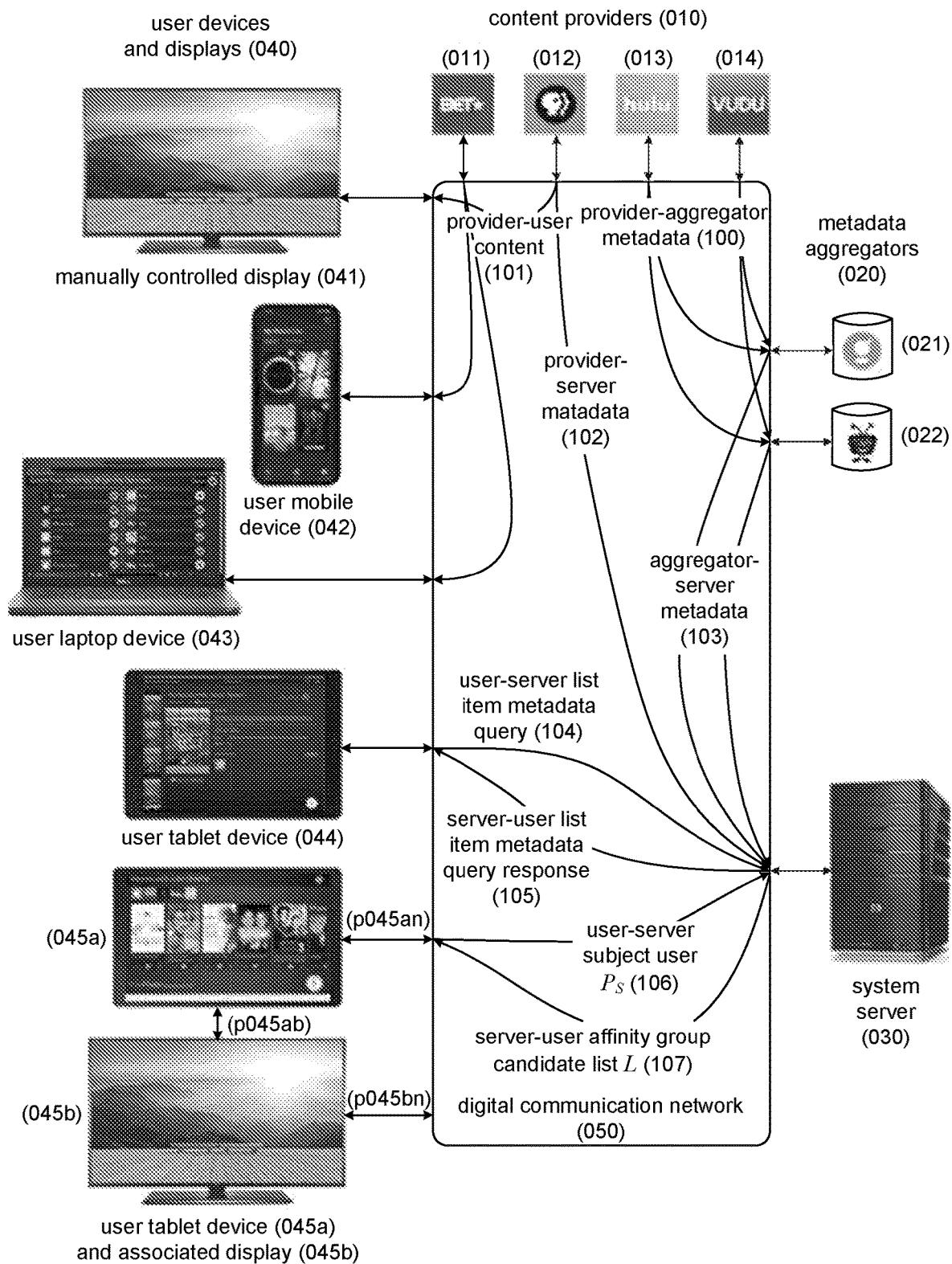
FIG. 7: Example Data Flows Within An Embodiment. Not all possible data flows of all types are exhibited. The exhibited connections and data flows are exemplary only and not intended to be limiting or defining.
Figure 8:
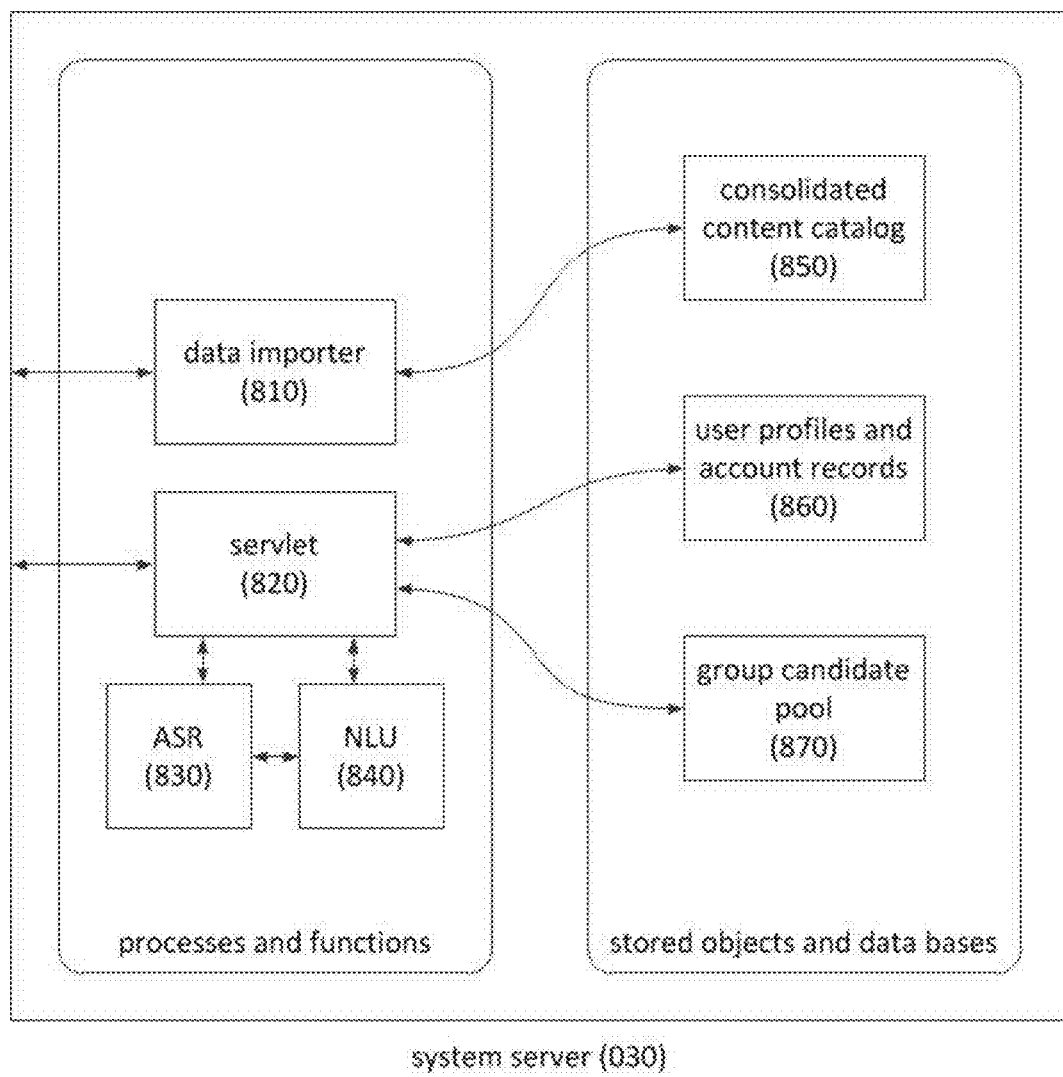
FIG. 8: Example System Server Components and Data Flows. The exhibited components and connections are exemplary only and not intended to be limiting or defining. Moreover, the distinction between "processes and functions" and "stored objects and data bases" is not hard and fast. As known to one skilled in the art, processes and functions may store data in and retrieve data from memory, both volatile and non-volatile. Likewise data bases and other storage modalities may not only read and write data to and from memory, they may often include processes for finding, sorting, selecting, retrieving and otherwise organizing said data according to various controls, algorithms or instructions. Not all processes and functions, not all stored objects and data bases, and not all data flows and communication pathways are shown. Though depicted here as a single functional unit, the indicated processes and functions, and stored objects and data bases, may in fact be distributed between or among a multiplicity of distinct physical servers. Not all stored objects and data bases, though depicted here as distinct, may actually be separated. For example the "user profiles and account records (860)" may reside in the same data base as the "group candidate pool (870)" and may in fact share data. Likewise data shown as residing in one stored object may in fact be subdivided among a multiplicity of stored objects.

In a next step, labeled 0910, the user device sends a query to the system server, comprising the list items for which possibly updated characteristics are sought. The associated data flow is depicted in FIG. 7 as data flow 104 user-server list item metadata query.

In a next step, labeled 0915, the system server receives the aforementioned query and retrieves possibly updated characteristics for each list item from system server storage.

In a next step, labeled 0920, the system server sends the possibly updated list item characteristics to the user device. The associated data flow is depicted in FIG. 7 as data flow 105 server-user list item metadata query response.

In a next step, labeled 0925, the user device receives the updated list item characteristics and retrieves the user notification criteria from user device storage.

In a next step, labeled 0930, the user device compares the interest list item characteristics retrieved in step 0905, the possibly updated interest list item characteristics received in step 0925, and the user notification criteria retrieved in step 0925.

In a next step, labeled 0935, the user device uses the results of the comparison performed in step 0930 to determine if one or more user notification criteria have been satisfied.

In a next step, labeled 0940, contingent upon the determination of step 0935, the user device generates one or more indicated notifications. It is to be noted that a single notification may list more than one item of interest that satisfies one or more notification criteria. It is also to be noted that depending upon the form or medium of the user notification, for example, operating system notification, in-app notification, SMS message, email message, social media message, or some other form, the generation of said user notification may entail signaling one or more other devices with the content and recipient of the notification.

In a next step, labeled 0945, the user device replaces the existing interest list item characteristics, stored in the user device memory, with the possibly updated interest list item characteristics. It is to be noted that if these are identical, in other words there is no substantive difference between the existing characteristics and the possibly updated characteristics, then this action may be skipped.

No mention has been made so far of the creation and storage of the updated interest list item characteristics detailed in steps 0915, 0920 and elsewhere. In this particular method this information may be drawn from a consolidated content catalog, which may be created, maintained and stored at the system server. The sources of data of this consolidated content catalog, and the associated data flows, are depicted in part in FIG. 7. Note in particular that in this particular method the system server 030 may receive both provider-server metadata 102 from one or more content providers 010 and aggregator-server metadata 103 from one or more metadata aggregators 020, which may be stored within the aforesaid consolidated content catalog within the system server. Note also that various metadata aggregators 020 may themselves receive provider-aggregator metadata 100 from one or more content providers. In addition one or more content providers 010 or metadata aggregators 020, or the system server 030 itself, may receive additional metadata from other sources, for instance production studios such as NBC Universal, LLC or online data repositories such as IMDb™. These other sources and associated data flows are not shown in FIG. 7.

It is to be noted that in the aforementioned design, the selection criteria are stored within user device memory, and the computation to determine if the selection criteria for any particular item of interest are satisfied takes place at the user device. This has an economic benefit to the operator of the system server, insofar as the expense of the memory and computing resource of the user device, which is typically owned and operated by the user, is typically borne by the user, rather than the system server, the expense of which is typically borne by the system operator. Thus the aforementioned method provides some economic benefit to the system operator.

It is also to be noted that in the aforementioned design, storing the selection criteria and the user's preferred services within user device memory affords a benefit of privacy to the user, insofar as this information is not necessarily transmitted to any other device to provide the benefits of the service. If the user wishes to conceal for instance their list of preferred services this benefit may be of substantial value to the user.

The aforementioned notification may take one or several forms. The preferred embodiment is a software application continuously or intermittently running on a user device, for example, a tablet like a Samsung Galaxy Tab A 10.5™" tablet, or an Apple iPad™, or a smartphone like an Apple iPhone™. In this case the application may asynchronously post a notification on the user device screen, without the user operating the application to perform a search.

However the notification may also be delivered only when the application is foregrounded, that is, when the user has explicitly invoked the application, or wakened (e.g., by foregrounding and/or operating a control of) a nominally running but otherwise passive and inactive instance of the application.

Or the notification may be delivered by some other means, such as an SMS or text message, an email message or a third-party social media application such as "Facebook Messenger." Similarly the notification may take place on one and the same user device, or on a completely separate device or computer. For example, the user may utilize a tablet to explore content items and place them on the watch list, but may choose to receive notifications via SMS message to a cellphone, or via email message to an email account. In another configuration the user may choose to receive notifications by a multiplicity of means, for instance both via the application running on the user device and via a social media application.

The content of the notification may vary with the selection criteria. For instance, the notification may advise the user that the item is now available, as when a film that has exclusively been in cinematic release may now be obtained from a digital content provider. Or it may advise that an item that was formerly only available for purchase is now available for rental. Or that an item that required payment to view is now available for free. Or that an item is now available from one or more preferred providers. This list of alternatives is merely exemplary and not exhaustive.

An important variant of the system is that the selection criteria may be fully or partially defaulted and not nominally set by the user. For example, in the vast majority of the cases, the user may be sensitive only to price, and/or the availability of titles from the list of preferred providers. Thus the selection criterion, attached to each item on the watch list, may be "title is newly available from any of the user's preferred providers" or "title price to rent from any provider has dropped below $5." As these are common cases, they are explicitly called out here as embodiments, without intention to be limiting.

Example Architecture and Methods

In one example architecture the software application, running on the host mobile device, maintains the user's interest list, along with associated selection criteria. The satisfying conditions of these selection criteria (e.g., price, price change, amount of price change, providers offering the asset, video resolution, etc.) are likewise maintained within the host mobile device.

On a daily basis, or more or less frequently, the items on the interest list are sent to the server component. That is, the software application queries the server for information about the items on the interest list. The server returns updated characteristics associated with each item. These are compared with the stored characteristics. If the updated characteristics now satisfy the selection criteria, according to the stipulated satisfying conditions, the user is notified of the event.

In this architecture the server maintains a central consolidated catalog for all supported digital content providers. This central consolidated catalog may be periodically or intermittently rebuilt from one or more data sources. For example, the central consolidated catalog, comprising each supported provider's catalog data, including the characteristics of each asset, may be obtained from one or more commercial metadata aggregators, or one or more free services providing similar information. Or it may be obtained by direct interaction with a given provider, either via a purpose-built digital interface, which may be made available by the provider either commercially or free, or via automatic or human extraction of the requisite information from the content provider's web site.

Alternative architectures exist, for instance in which the software application does not query the server. Rather information is broadcast from the server to all instances of the application, running on host mobile devices, which then perform the above-described check for the items recorded in that device's interest list.

Alternative architectures exist, for instance in which the system comprises a website or web service, and no software application, other than a conventional web browser, to access this website or web service, runs in the user's device, which may or may not be a mobile device, tablet or laptop computer. In this case the associated user data (e.g., items on the user's interest list, associated selection criteria, preferred services, etc.) may be stored at the website or web service, may be held within a "cookie" at the device hosting the web browser, or may be retained at some other location by some other means.

Conversely the server component may be dispensed with, and its functions performed by a software application running on a user device, which may or may not be a mobile device, tablet or laptop computer. In this case the application may query the aforesaid digital content providers for the necessary information.

We now describe the preferred embodiment of a version of the system that finds and proposes affinity groups within the user community. In the preferred embodiment this version will include a system server and a facility for creation of individual user accounts.

As discussed above this version of the system may find, for a given user, one or more other individuals, within a community of users, with whom the subject user may wish to form an affinity group, and notify the subject user of this finding, for example by mutual introduction of users who have similar characteristics. Typically such an affinity group, once formed, will comprise only the subject user and one other individual (a "two-party" affinity group); in this respect this version of the system is akin to a dating application. However this design is only typical and the formation of larger affinity groups is possible and explicitly contemplated and supported.

Various criteria may be used to identify the candidate affinity group members who have similar characteristics. Examples of similar characteristics between or among users may include identical or significantly overlapping watch lists, as determined by listed titles; by genre, era, franchise, cast members, director or other characteristic of listed titles; or some other means. Candidates may be ranked by the degree to which their watch lists overlap with those of the subject user or other candidate group members. Candidates may comprise or be limited to those for whom the one or more shared watch list items are presently available from one or more of the candidate's preferred providers. Candidates may comprise or be limited to those of a specified gender, age range or other personal characteristic. Candidates may comprise or be limited to those within a given geographic radius of the subject user. Candidates may comprise or be limited to those who wish to be available for affinity group formation. Candidates may comprise or be limited to those who wish to be available only for "two-party" affinity groups, or conversely those who wish to be available only for affinity groups with more than two members. In any event the number of identified candidates may exceed one individual. All aforementioned variations in candidate selection are exemplary and not intended to be limiting.

One example mechanism by which system users may individually select among the aforementioned variations is by completing a questionnaire at the time of creation of an associated user account, or by later creation or editing of such a questionnaire.

User notifications may include contact information for the one or more other individuals, or other means of enabling mutual communication among individuals who may be otherwise unknown to one another, and the title(s) of the items found in common among the users' watch lists. User notifications may be provided only to the subject user, or to the candidate members as well. If provided only to the subject user, user notifications may allow the subject to propose further communication or affinity group membership to each candidate individually or to all candidates. User notifications may condition sharing of contact information upon the mutual consent of the subject user and each candidate. To aid users in deciding when to offer such consent, a user account may also include a personal profile, which may include one or more photographs and a prose description.

The finding of candidate group members may be performed asynchronously or upon demand. That is, the user may provide to the system personal characteristics and other information useful for the finding of candidate affinity group members, and then wait for the system to asynchronously send notifications of proposed candidates. Alternately, the user may signal to the system, for example by operating a control within the application, a request to perform a search for candidate affinity group members, to which the system will respond with a list of candidates, or an indication that no candidates are available.

Figure 12:
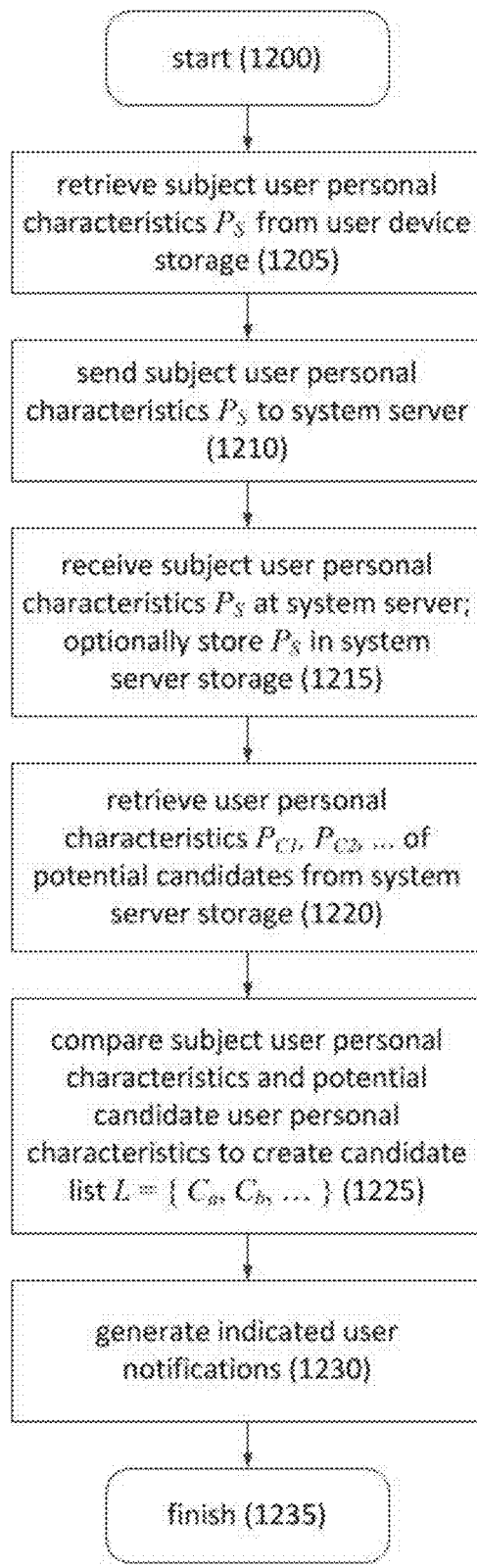
FIG. 12: A Method of Finding and Achieving User Notification of Candidate Affinity Groups. A flow diagram of a method of finding and achieving user notification of candidate affinity groups for one embodiment of the system.

We now describe a preferred method for user notification of candidate affinity groups. This is not the only such method; the following description should be regarded as exemplary and not limiting. The description that follows is best understood with reference to FIG. 12; cited numbered steps are references to steps in that figure.

We consider initially a case where the finding of group member candidates is performed on demand; that is in response to the user initiating said finding. This may be done for example by the user operating a control on the user device, presenting a suitable natural language command to the user device, or some other means.

Responsive to this user action, in a first step, denoted 1205, the system retrieves subject user personal characteristics $P_S$ from a user device memory. $P_S$ may for example comprise the titles on the subject user's watch list. It may also comprise, additionally or alternately, any of the characteristics of listed titles set forth in preceding paragraphs, or other pertinent personal characteristics. It may also comprise, additionally or alternately, other criteria for including other users as affinity group candidates, for example gender, physical proximity to the subject user, or other pertinent criteria.

In a next step, denoted 1210, the system sends the subject user personal characteristics $P_S$ to the system server.

In a next step, denoted 1215, the system server receives the subject user personal characteristics $P_S$ and optionally stores $P_S$ in system server storage, so that the subject user may be used as a potential candidate for requests of other subject users.

In a next step, denoted 1220, the system server retrieves user personal characteristics $P_{C1}$, $P_{C2}$, . . . of potential candidates from system server storage. This step may optionally involve some filtering of potential candidates, for example by gender, physical proximity, or other pertinent criteria.

In a next step, denoted 1225, the system server compares similarity of the personal characteristics $P_S$ of the subject user and the user personal characteristics $P_{Ci}$ of each potential candidate. Each potential candidate Ci for which $P_S$ and $P_{Ci}$ are judged sufficiently similar is then added to the candidate list L. The judgment of "sufficiently similar" may be made, for example if each set of personal characteristics comprises the items on the corresponding user's watch list, by counting the number of items present on both watch lists, that is, the size of $P_S \cap P_{Ci}$, and confirming that this meets some predetermined threshold, or possibly some predetermined fraction of the size of $P_S$ itself. Or it may be made by other well-known statistical means of judging similarity between two sets of characteristics, or by use of a suitably trained neural network, or by any other suitable means.

It will be apparent to one skilled in the art that steps 1220 and 1225 may also be performed in an interleaved fashion, wherein user personal characteristics of potential candidates are serially retrieved from system server storage and likewise serially considered for inclusion on the candidate list L, so that the entirety of potential candidates need not be retrieved all at once.

In a next step, denoted 1230, suitable notification is made to the subject user, and possibly the candidates as well, of the candidate list L so assembled. This notification may proceed, for example, by sending the candidate list to the subject user's user device, for presentation to the user as a notification on that device. Or it may proceed by sending an email to the subject user. Or if the candidates are to be notified as well, similar actions may be taken with respect to each of the candidates. Many variations are possible, and those discussed here should be taken as examples only and not as limiting.

Figure 13:
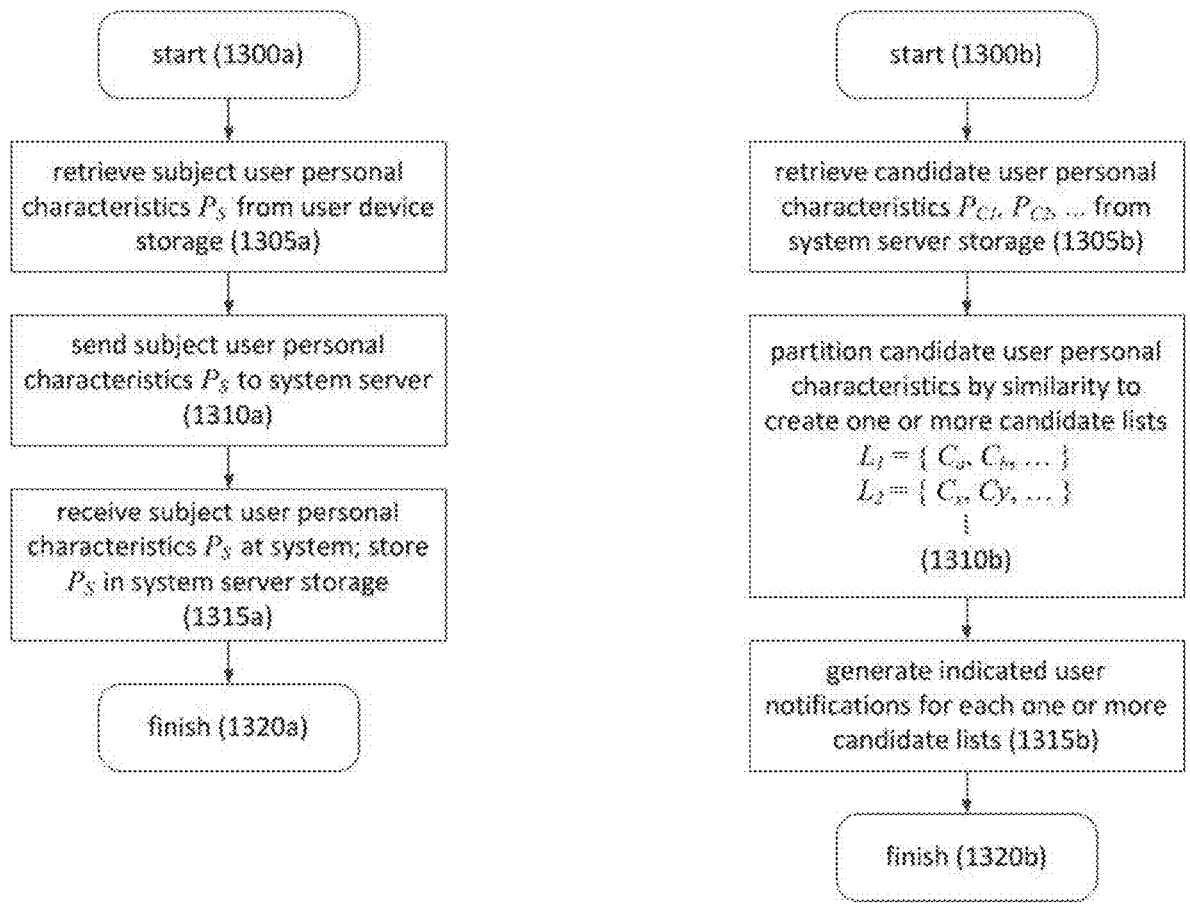
FIG. 13: A Method of Finding and Achieving User Notification of Candidate Affinity Groups, Asynchronous Variation. A pair of flow diagrams, together comprising a method of finding and achieving user notification of candidate affinity groups for one embodiment of the system.

One asynchronous variation of this is presented in FIG. 13. In this variation the subject user supplies personal information to the system server via the steps 1305a through 1315a detailed in that figure. The system server may then asynchronously, for example, periodically, perform steps 1305b through 1315b to find candidate affinity groups. In step 1310b any of the methods detailed above to assess the similarity of personal characteristics of users may be applied to obtain the indicated partition.

We now describe a preferred method for a group of users to discover one or more mutually acceptable video titles to view, or to learn that the group shares no such mutually acceptable video titles. In what follows we will assume that this group has already been established within the system, and that the system server presently holds all needed information pertinent to the members of the group and their characteristics.

This group may comprise a subset of a larger pre-existing group. We will refer to the current group as the participating group, denoted G, and to its members as the participating members. In the following it is assumed that one of the participating members acts as the initiating member, denoted I. It is also assumed that the system server may hold in storage the winnowed watch list for each participating group member. An alternate method that does not depend upon this assumption is also described below.

By a "winnowed watch list" is meant items on a watch list for a given user that are presently available for streaming from one of the preferred providers of that same user. Note that different users may have different preferred provider lists.

Figure 14:
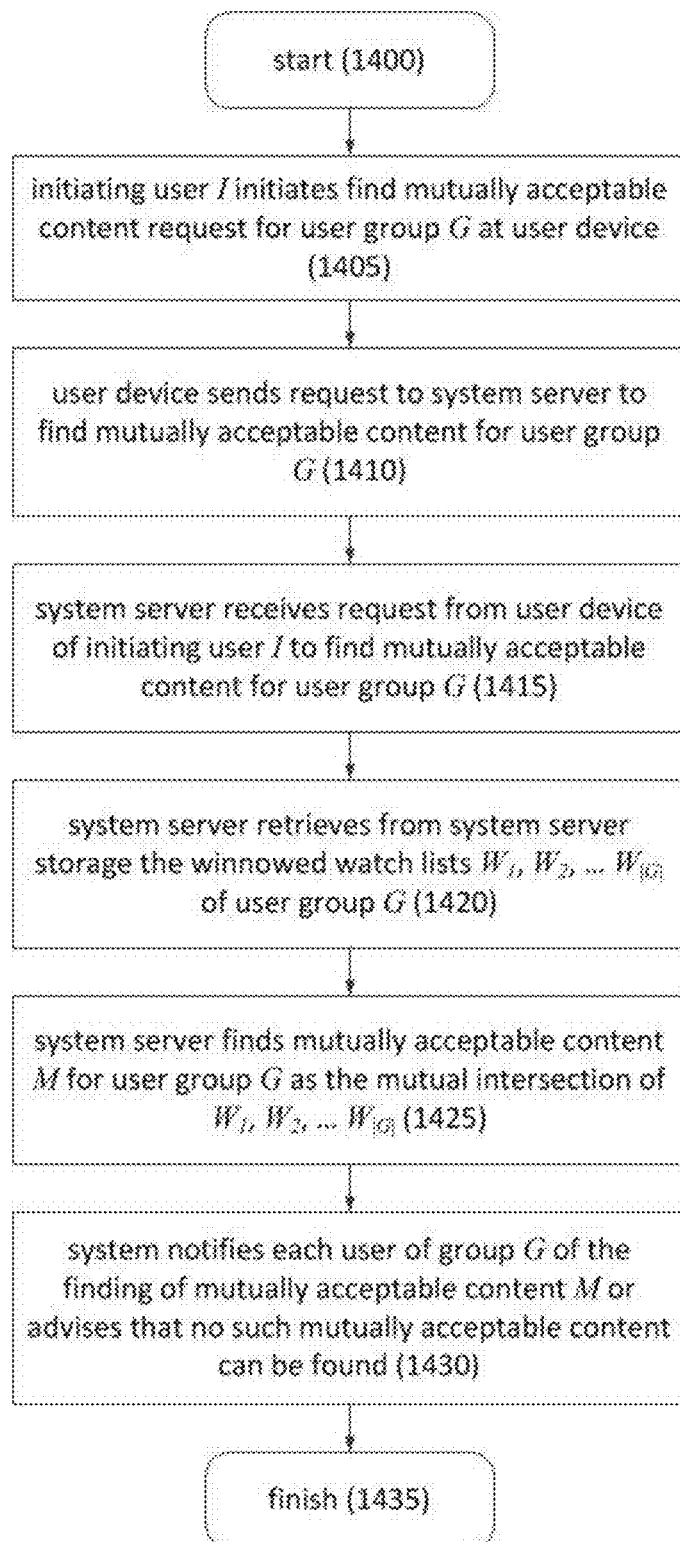
FIG. 14: A Method of Finding and Achieving User Notification of Content Mutually Acceptable to a Given User Group.

Hereafter we will drop the word "participating" which is to be understood, and refer only to the user group G. The description that follows is best understood with reference to FIG. 14; cited numbered steps are references to steps in that figure.

In a first step 1405 the initiating user I initiates a find mutually acceptable content request for user group G at a user device, for example by operating a control to create the request, said control also providing a means to identify the user group G, or by issuing a suitable spoken or typed natural language command, or by some other method.

In a next step 1410 the user device sends a request to the system server to find mutually acceptable content for user group G; this includes either identifying information for user group G or identifying information for each of its members.

In a next step 1415 the system server receives the request from the user device operated by initiating user I to find mutually acceptable content for user group G.

In a next step 1420 the system server retrieves from system server storage the winnowed watch lists $W_1$, $W_2$, $W_3$, ..., $W_{|G|}$ of user group G.

In the next step 1425 the system server computes the mutually acceptable content M for user group G as the mutual intersection of the aforementioned watch lists. In symbols this is stated as $M = W_1 \cap W_2 \cap W_3 \cap \ldots \cap W_{|G|}$.

In the next step 1430 the system notifies each user of group G of the finding of mutually acceptable content M or advises that no such mutually acceptable content can be found.

In a variation of the above method, step 1420 may be replaced by a step wherein the system server communicates with the user device of each member of the user group G, excluding the initiating user I, and causes the user device to transmit to the system server the winnowed watch list for each said member. This eliminates the requirement that each such winnowed watch list be available to be retrieved from system server storage.

In another variation of the above method, step 1420 may be replaced by a step wherein the system server transmits a suitable prose message to each member of the user group G, advising them of the request by initiating user I, and request each said user to perform a suitable operation on their associated user device to cause a winnowed watch list to be sent to the system server.

Variants and Generalizations

In the paragraphs that follow, various alternate mechanisms, components, or means of operating or configuring one or more elements of the system are listed. Each alternative constitutes a variant or generalization of the system, or portion thereof. These variants or generalizations may or may not be described elsewhere in this document. The listed variants or generalizations are not to be regarded as limiting or constraining. That is, for each variety of variant or generalization described below, there may be still other variants or generalizations, obvious to those skilled in the art.

Manner and Mechanism of Notification

The user may be notified within the application portion of the system; that is, only when the application is being actively manipulated by the user.

Alternately, the user may be notified externally to the application portion of the system; that is, notification may occur without the active manipulation of, operation of or execution of the application. This notification may occur on the device that is hosting or running the application, or it may occur on an external device, via a mechanism like an SMS message or an email message.

Monitored Services

The services that are monitored for availability or change of one or more characteristics of a given title may be those explicitly selected for monitoring by the user. These are known as the "preferred" digital content services.

Alternately, the system may monitor all known services for availability or change or one or more characteristics of a given title.

Finally both possibilities may be simultaneously operational, wherein the notification of availability or change etc is of one type when the availability or change pertains to a preferred service, and of another type when the availability or change pertains to a non-preferred service.

Frequency of Monitoring and Notification

Nominally the system will once daily check for significant changes in the interest list item statuses.

Alternately the system may provide a means for the user to set the frequency to check for said significant changes. This may involve choosing among alternatives, or setting an explicit time interval, within a given range, to perform said checking. Or a different default value may be used.

Notification of the user of a status change may occur synchronously with said checks or may be intentionally skewed therefrom by either a fixed interval, an algorithmically determined interval, or a random interval. This skewing may be done for any of the convenience of the user (so as not to disturb them during particular hours) or to level the operational load upon the system server.

Examples of Selection Criteria

Item is available for outright purchase or for streaming, or both.

Item price has dropped, or is now available at a price below some preset threshold.

Item is now available free.

Item is available from a given preferred streaming service, for example Amazon Prime Video.

Item is available in a given resolution, for example 8K.

New items are available that feature a given actor, for example Daniel Radcliffe.

New items are available in a given franchise, for example Marvel Avengers.

New items are available that feature a given fictional character, for example Harry Potter.

New items are available on a particular subject, for example semiconductor physics.

Recording Only Minimal or Best Current Selection Criteria

The system records only the minimal or best current characteristics, and notifies for instance when an asset is available from any provider at a given price.

The system associates asset characteristics with particular providers, and notifies the user when the asset is available with those characteristics only from a particular provider.

Scope of Selection Criteria

The scope of a selection criteria set may be all the items on the user's interest list.

The scope of a selection criteria set may be only one or more selected items on the user's interest list.

Creation of Selection Criteria

The user may explicitly declare the selection criteria.

The system may determine the selection criteria by monitoring past selection criteria.

The system may determine the selection criteria by observation of the characteristics of the user's viewing hardware, e.g., Kindle reader or UHD or 8K monitor.

Creation of Interest List

The user creates the interest list by explicit actions.

The system automatically adds items to the interest list, by monitoring past user viewing choices.

Source of Content Provider Catalog and Asset Characteristics

The catalog of a given service and the characteristics of the catalog assets may be obtained from a professional data business, or a free service that provides the same or similar information.

The catalog of a given service and the characteristics of the catalog assets may be obtained from by-hand or automatic analysis of online or otherwise published descriptions, provided by the service, or its proxies, subordinates or partners.

Computer System

Figure 15:
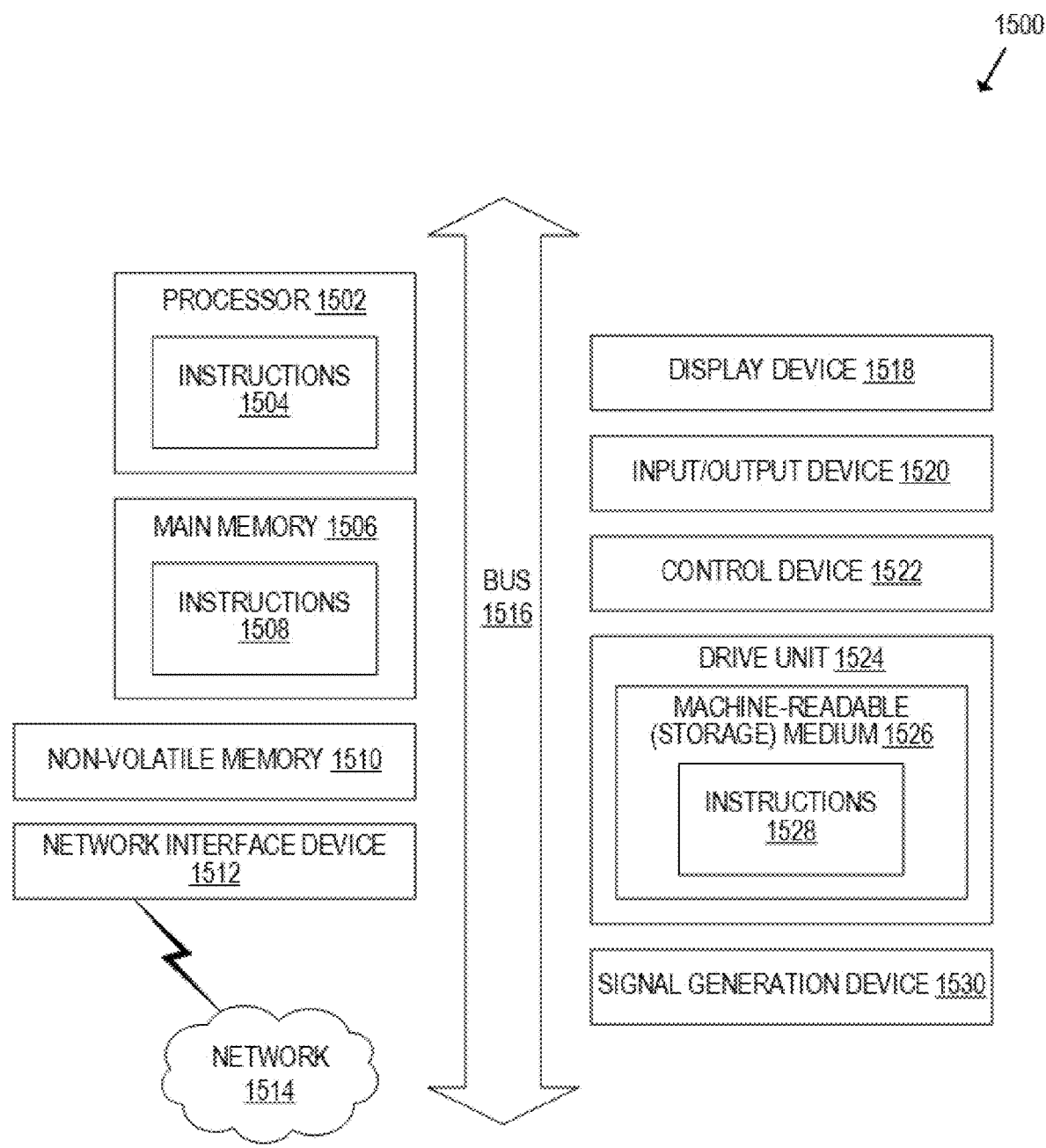
FIG. 15: A Block Diagram that Illustrates an Example of a Computing System in Which at Least Some Operations Described Herein Can be Implemented.

FIG. 15 is a block diagram that illustrates an example of a computer system 1500 in which at least some operations described herein can be implemented. For example, components discussed relative to the other figures can include or host components of the computing system 1500.

As shown, the computer system 1500 can include one or more processors 1502, main memory 1506, non-volatile memory 1510, a network interface device 1512, video display device 1518, an input/output device 1520, a control device 1522 (e.g., keyboard and point device), a drive unit 1524 that includes a storage medium 1526, and a signal generation device 1530 that are communicatively connected to a bus 1516. The bus 1516 represents one or more physical buses and/or point-to-point connections that are connected by appropriate bridges, adapters, or controllers. The bus 1516 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 15 for brevity. Instead, the computer system 1500 is intended to illustrate a hardware device on which components illustrated or described relative to the examples figures and any other components described in this specification can be implemented.

The computer system 1500 can take any suitable physical form. For example, the computing system 1500 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1500. In some embodiment, the computer system 1500 can be an embedded computer system, a system-on-chip (SOC), a single-board computer system (SBC) or a distributed system such as a mesh of computer systems or include one or more cloud components in one or more networks. Where appropriate, one or more computer systems 1500 can perform operations in real-time, near real-time, or in batch mode.

The processor 1502 can be, for example, a central processing unit, a conventional microprocessor (e.g., Intel Pentium processor). The memory (e.g., main memory 1506, non-volatile memory 1510, machine-readable medium 1526) can be local, remote, or distributed. Although shown as single medium, the machine-readable medium 1526 can include multiple media (e.g., a centralized/distributed database and/or associated caches and servers) that store one or more sets of instructions 1528. The machine-readable (storage) medium 1526 can include any medium that is capable of storing, encoding, or carrying a set of instructions for execution by the computing system 1500. One of skill in the relevant art will recognize that the machine-readable medium 1526 can include any type of medium that is accessible by the processor. The machine-readable medium 1526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in computing device(s). When read and executed by the processor 1502, the instruction(s) cause the computing system 1500 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 1510, removable flash memory, hard disk drives, optical disks, and transmission-type media such as digital and analog communication links.

Software is typically stored in the non-volatile memory and/or the drive unit 1524. When software is moved to the memory for execution, the processor 1502 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 1512 enables the computing system 1500 to mediate data in a network 1514 with an entity that is external to the computing system 1500 through any communication protocol supported by the computing system 1500 and the external entity. Examples of the network interface device 1512 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 1512 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 1520 include a keyboard, a mouse or other pointing device, disk drives, printers, a scanner, and other input and/or output devices, including a display device. Examples of the display device 1518 can include a cathode ray tube (CRT), liquid crystal display (LCD), or any display device.

In operation, the computer system 1500 can be controlled by operating system software that includes a file management system, such as a disk operating system. One example of operating system software with associated item management system software is the family of operating systems known as Windows® from Microsoft Corporation of Redmond, Wash., and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

REMARKS

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A computer-implemented method for monitoring and notifying a user of changes to characteristics of interest list items, the method comprising:
    recording, within a memory of a user device,
        (i) a specification of said interest list items and characteristics thereof,
        (ii) a specification of criteria for notification of changes to said characteristics of said interest list items, and
        (iii) a specification of an affinity group of which said user is a member;
    querying a data source from which said interest list items are available on a periodic basis for information related to said characteristics of said interest list items;
    receiving, at said user device, said information from said data source in response to said querying;
    comparing at said user device said information with (i) said recorded specification of said user's interest list items and said characteristics thereof and (ii) said recorded specification of said criteria for notification of changes to said characteristics of said interest list items;
    determining, at said user device in response to said comparing, that
        (i) one or more interest list items have updated characteristics, and
        (ii) one or more of said criteria for notification of changes to said characteristics of said interest list items are satisfied;
    generating, at said user device in response to said determining, a notification to said user of said updated characteristics of said one or more interest list items, such that said user is notified asynchronously of changes to said characteristics and said interest list items without the need to perform a search;
    replacing, within said memory of said user device, said characteristics of said interest list items with said updated characteristics of said interest list items;
    receiving, at said user device, first input indicative of a request by said user to find mutually acceptable content for said affinity group; and
    transmitting said request to a destination external to said user device, to prompt computation of said mutually acceptable content as the mutual intersection of respective interest list items of members of said affinity group; and
    receiving, at said user device, second input indicative of a specification of said mutually acceptable content.

2. The method of claim 1, wherein additionally is recorded a specification of said user's preferred services.

3. The method of claim 2, wherein said notification criteria comprises the availability of one or more of said user's interest list items from one or more of said user's preferred services.

4. The method of claim 1, wherein said update information is received from a user server in response to a query sent from said user device to said user server comprising said user's items of interest.

5. The method of claim 1, wherein said notification criteria comprises the availability of one or more of said user's interest list items from a streaming service.

6. The method of claim 1, wherein said notification criteria comprises the availability of one or more of said user's interest list items at any one of:
    lower price; or
    different offering terms.

7. The method of claim 1, wherein said notification to said user comprises a notification appearing on said user device.

8. The method of claim 1, wherein said notification to said user comprises an SMS message, an email message or a social media message.

9. The method of claim 1, wherein said affinity group is automatically discovered through analysis of said interest list items, said characteristics of said interest list items, or a combination thereof.

10. The method of claim 9, wherein said affinity group includes said user and only one other individual, and wherein said one other individual is determined to have a highest degree of overlap among multiple individuals with said interest list items.

11. The method of claim 1, wherein members of said affinity group are limited to a specific personal characteristic or a specific geographic radius of said user.

12. The method of claim 1, further comprising:
    in response to recording within said memory of said user device said specification of said affinity group of which said user is a member, causing at least one other member of said affinity group to be notified.

13. The method of claim 1, further comprising:
    determining at said user device that said user has initiated a search for mutually acceptable content for members of said affinity group;
    sending a request to a user server to find said mutually acceptable content for said members of said affinity group;
    receiving at said user device information regarding said mutually acceptable content; and
    generating a second notification to said user of said mutually acceptable content determined by said user server.

14. At least one computer-readable storage medium, excluding transitory signals and carrying instructions, which, when executed by at least one processor, cause a system to:
    record, within a memory of a user device,
        (i) a specification of said interest list items and characteristics thereof,
        (ii) a specification of criteria for notification of changes to said characteristics of said interest list items, and (iii) a specification of an affinity group of which said user is a member;
receive, at said user device, update information comprising updated characteristics of one or more interest list items;
compare, at said user device, said update information with (i) said recorded specification of said interest list items and said characteristics thereof and (ii) said recorded specification of said criteria for notification of changes to said characteristics of said interest list items;
determine, at said user device, that one or more of said criteria for notification of changes to said characteristics of said interest list items are satisfied;
generate, at said user device in response to said determining, a notification to said user of said changes to said characteristics of said interest list items for at least one of said interest list items;
replace, within said memory of said user device, said characteristics of said interest list items with said updated characteristics of said interest list items;
receiving, at said user device, first input indicative of a request by said user to find mutually acceptable content for said affinity group; and
transmitting said request to a destination external to said user device, to prompt computation of said mutually acceptable content as the mutual intersection of respective interest list items of members of said affinity group; and
receiving, at said user device, second input indicative of a specification of said mutually acceptable content.

15. The at least one computer-readable storage medium of claim 14, wherein additionally is recorded a specification of said user's preferred services.

16. The at least one computer-readable storage medium of claim 14, wherein said update information is received from a user server in response to a query sent from said user device to said user server comprising said user's items of interest.

17. The at least one computer-readable storage medium of claim 14, wherein said notification criteria comprises the availability of one or more of said user's interest list items from a streaming service.

18. The at least one computer-readable storage medium of claim 15, wherein said notification criteria comprises the availability of one or more of said user's interest list items from one or more of said user's preferred services.

19. The at least one computer-readable storage medium of claim 14, wherein said notification criteria comprises the availability of one or more of said user's interest list items at any one of:
lower price; or
different offering terms.

20. The at least one computer-readable storage medium of claim 14, wherein said notification to said user comprises a notification appearing on said user device.

21. The at least one computer-readable storage medium of claim 14, wherein said notification to said user comprises an SMS message, an email message or a social media message.

* * * * *